US011146932B2

(12) United States Patent
Hong

(10) Patent No.: US 11,146,932 B2
(45) Date of Patent: Oct. 12, 2021

(54) UNMANNED AERIAL VEHICLE AUTHENTICATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/760,438

(22) PCT Filed: Nov. 3, 2017

(86) PCT No.: PCT/CN2017/109234
§ 371 (c)(1),
(2) Date: Apr. 29, 2020

(87) PCT Pub. No.: WO2018/141170
PCT Pub. Date: Aug. 9, 2018

(65) Prior Publication Data
US 2020/0260242 A1    Aug. 13, 2020

(51) Int. Cl.
*H04W 4/50*      (2018.01)
*H04W 4/40*      (2018.01)
(Continued)

(52) U.S. Cl.
CPC ............ *H04W 4/50* (2018.02); *G08G 5/0013* (2013.01); *H04W 4/40* (2018.02); *H04W 72/048* (2013.01)

(58) Field of Classification Search
CPC ....... H04W 4/50; H04W 4/40; H04W 72/048; G08G 5/0013
See application file for complete search history.

(56) References Cited

U.S. PATENT DOCUMENTS

2016/0014815 A1   1/2016  Vajapeyam et al.
2016/0327956 A1*  11/2016 Zhang ................. B64D 47/08
(Continued)

FOREIGN PATENT DOCUMENTS

CN   101583170 A   11/2009
CN   101626623 A    1/2010
(Continued)

OTHER PUBLICATIONS

First Office Action of Chinese Application No. 201780003580.1 dated Feb. 26, 2021 with English translation, (43p).
(Continued)

*Primary Examiner* — Dinh Nguyen
(74) *Attorney, Agent, or Firm* — Arch & Lake LLP

(57) ABSTRACT

The present disclosure relates to an unmanned aerial vehicle authentication method and apparatus. The method includes: determining whether the unmanned aerial vehicle is a lawful unmanned aerial vehicle or an unlawful unmanned aerial vehicle in response to receiving the flight status information reported by the unmanned aerial vehicle, where the flight status information is configured to indicate that an altitude of the unmanned aerial vehicle from the ground is greater than or equal to a preset altitude threshold; providing a communication service for the unmanned aerial vehicle in response to the unmanned aerial vehicle being the lawful unmanned aerial vehicle; and stopping the provision of the communication service for the unmanned aerial vehicle in response to the unmanned aerial vehicle being the unlawful unmanned aerial vehicle.

13 Claims, 16 Drawing Sheets

(51) Int. Cl.
   *G08G 5/00*      (2006.01)
   *H04W 72/04*    (2009.01)

(56)  References Cited

U.S. PATENT DOCUMENTS

| | | | |
|---|---|---|---|
| 2016/0371987 | A1 | 12/2016 | Kotecha |
| 2017/0129603 | A1* | 5/2017 | Raptopoulos ........ G08G 5/0069 |
| 2018/0128895 | A1* | 5/2018 | Seeber ................ G08G 5/0026 |
| 2018/0293898 | A1* | 10/2018 | Redmann ............... G08G 5/006 |
| 2020/0219408 | A1* | 7/2020 | Han ........................ G08G 5/006 |

FOREIGN PATENT DOCUMENTS

| | | |
|---|---|---|
| CN | 104936180 A | 9/2015 |
| CN | 104955047 A | 9/2015 |
| CN | 105139178 A | 12/2015 |
| CN | 105206116 A | 12/2015 |
| CN | 105338573 A | 2/2016 |
| CN | 105608931 A | 5/2016 |
| CN | 105761550 A | 7/2016 |
| CN | 105825716 A | 8/2016 |
| CN | 106664511 A | 5/2017 |
| CN | 107222518 A | 9/2017 |
| KR | 101701397 B1 | 2/2017 |

OTHER PUBLICATIONS

The International Search Report of PCT Application No. PCT/CN2017/109234 dated Mar. 29, 2018 (4p).

* cited by examiner

UNMANNED AERIAL VEHICLE AUTHENTICATION METHOD AND APPARATUS

CROSS-REFERENCE TO RELATED APPLICATIONS

This application is a national phase application based on PCT/CN2017/109234, filed on Nov. 3, 2017, the content of which is incorporated herein by reference.

TECHNICAL FIELD

The present disclosure relates to the field of communication technology, and more particularly to an unmanned aerial vehicle authentication method and apparatus.

BACKGROUND

Unmanned aerial vehicles are unmanned aircrafts operated by using a radio remote control device and a self-provided program control apparatus. The unmanned aerial vehicles have the advantages such as wide use, low cost, good cost-effectiveness ratio, no risk of casualties, high survivability, good maneuverability, and convenience in use, thereby playing an extremely important role in modern warfare and having a broader prospect in civilian field.

In the related art, the unmanned aerial vehicle may be loaded with a special chip for an unmanned aerial vehicle based on cellular network through which the unmanned aerial vehicle can establish a radio resource control (RRC) connection with a base station. In this way, a control terminal can send various control information to the unmanned aerial vehicle through the base station to realize the control for the unmanned aerial vehicle.

However, while consumers are buying the unmanned aerial vehicles to enjoy the new experience brought by scientific and technological progress, more unmanned aerial vehicles frequently break into the obstacle-free protection zones of airports from place to place, causing flight delays and threatening aviation safety. Therefore, cracking down on "unlawful flying and chaotic flying" of the unmanned aerial vehicles has become an urgent issue.

SUMMARY

Embodiments of the present disclosure provide an unmanned aerial vehicle authentication method and apparatus. The technical solutions are as follows:

According to a first aspect of embodiments of the present disclosure, an unmanned aerial vehicle authentication method is provided. The method includes:

determining whether the unmanned aerial vehicle is a lawful unmanned aerial vehicle or an unlawful unmanned aerial vehicle in response to flight status information reported by the unmanned aerial vehicle being received, wherein the flight status information is configured to indicate that an altitude of the unmanned aerial vehicle from ground is greater than or equal to a preset altitude threshold;

providing a communication service for the unmanned aerial vehicle in response to the unmanned aerial vehicle being the lawful unmanned aerial vehicle; and stopping the provision of the communication service for the unmanned aerial vehicle in response to the unmanned aerial vehicle being the unlawful unmanned aerial vehicle.

According to a second aspect of embodiments of the present disclosure, an unmanned aerial vehicle authentication method is provided. The method includes:

obtaining a current altitude from ground, wherein the altitude from the ground is a distance between the unmanned aerial vehicle and the ground; and sending flight status information to a base station in response to the altitude from the ground being greater than or equal to a preset altitude threshold.

According to a third aspect of embodiments of the present disclosure, an unmanned aerial vehicle authentication apparatus is provided. The apparatus includes:

a first processor; and a first memory for storing instructions executable by the first processor;

wherein the first processor is configured to:

determine whether the unmanned aerial vehicle is a lawful unmanned aerial vehicle or an unlawful unmanned aerial vehicle in response to flight status information reported by the unmanned aerial vehicle being received, wherein the flight status information is configured to indicate that an altitude of the unmanned aerial vehicle from ground is greater than or equal to a preset altitude threshold;

provide a communication service for the unmanned aerial vehicle in response to the unmanned aerial vehicle being the lawful unmanned aerial vehicle; and stop the provision of the communication service for the unmanned aerial vehicle in response to the unmanned aerial vehicle being the unlawful unmanned aerial vehicle.

According to a fourth aspect of embodiments of the present disclosure, an unmanned aerial vehicle authentication apparatus is provided. The apparatus includes:

a second processor; and a second memory for storing instructions executable by the second processor;

wherein the second processor is configured to:

obtain a current altitude from ground, wherein the altitude from the ground is a distance between the unmanned aerial vehicle and the ground; and send flight status information to a base station in response to the altitude from the ground being greater than or equal to a preset altitude threshold.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of the specification, illustrate embodiments consistent with the present disclosure, and together with the description, serve to explain the principles of the present disclosure.

DETAILED DESCRIPTION

Figure 1:
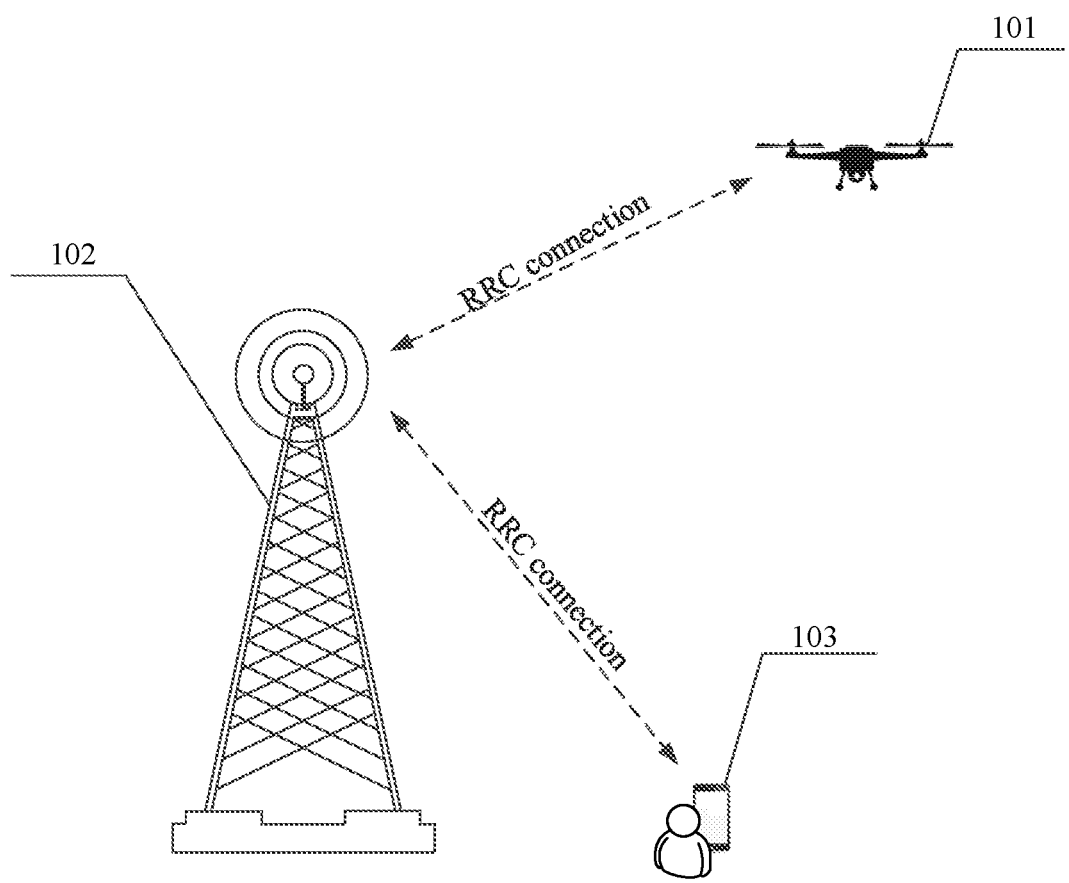
FIG. 1 is a scenario diagram of applying an unmanned aerial vehicle authentication method according to an exemplary embodiment.

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of apparatuses and methods consistent with aspects related to the disclosure as recited in the appended claims.

The technical solution provided by the embodiment of the present disclosure relates to an unmanned aerial vehicle, a base station, and a control terminal. As shown in FIG. 1, the unmanned aerial vehicle 101 establishes an RRC connection with the base station 102 through a loaded special chip for an unmanned aerial vehicle based on cellular network. The control terminal 103 may establish the RRC connection with the base station through a loaded subscriber identification module (SIM) card. The control terminal 103 may be a mobile phone, a tablet computer, a smart watch, and other devices capable of controlling the unmanned aerial vehicle, which is not limited by the embodiment of the present disclosure. In the related art, the control terminal 103 may send a control instruction to the base station 102, and the base station 102 may forward the control instruction to the unmanned aerial vehicle 101. After receiving the control instruction, the unmanned aerial vehicle 101 executes the related actions of the control instruction, thereby realizing; the control of the unmanned aerial vehicle 101 by the control terminal 103. If the unmanned aerial vehicle 101 needs to send data information to the control terminal 103, it may also send the data information to the base station 102 at first, and then the base station 102 forwards the data information to the control terminal 103. However, if the base station 102 provides communication services for every unmanned aerial vehicle that establishes the RRC connection therewith, the problem of unlawful flight of an unlawfully operating unmanned aerial vehicle in a restricted area cannot be monitored, which is not conducive to the long-term development of the unmanned aerial vehicle. In the technical solution provided by the embodiment of the present disclosure, the base station may determine whether the unmanned aerial vehicle currently in a flight status is a lawful unmanned aerial vehicle or an unlawful unmanned aerial vehicle, provide a communication service for the unmanned aerial vehicle when it is the lawful unmanned aerial vehicle, and stop the provision of the communication service for the unmanned aerial vehicle when it is the unlawful unmanned aerial vehicle, thereby achieving supervision for the unmanned aerial vehicle, improving the flight safety of the unmanned aerial vehicle, and facilitating the long-term development of the unmanned aerial vehicle.

The embodiment of the present disclosure provides an unmanned aerial vehicle authentication method. Execution subjects implementing the method include an unmanned aerial vehicle and a base station. Two sets of embodiments are set according to different execution subjects by the embodiments of the present disclosure, and are described as follows:

Base Station Side

Figure 2A:
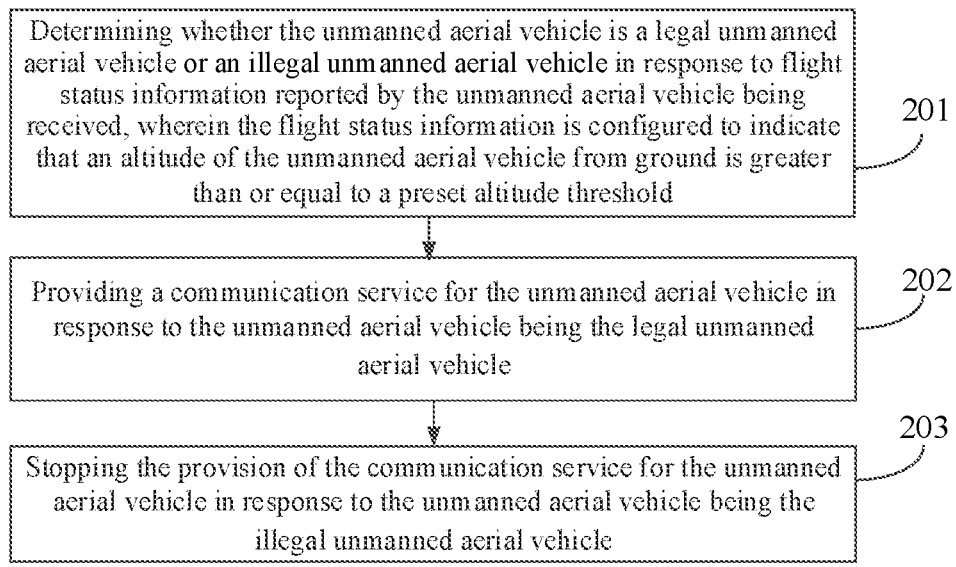
FIG. 2A is a flowchart of an unmanned aerial vehicle authentication method according to an exemplary embodiment.

FIG. 2A is a flowchart of an unmanned aerial vehicle authentication method according to an exemplary embodiment: The method is implemented by a base station. As shown in FIG. 2A, the unmanned aerial vehicle authentication method includes following steps 201 to 203:

In step 201, in response to receiving flight status information reported by the unmanned aerial vehicle, the base station determines whether the unmanned aerial vehicle is a lawful unmanned aerial vehicle or an unlawful unmanned aerial vehicle. Here, the flight status information is configured to indicate that an altitude of the unmanned aerial vehicle from the ground is greater than or equal to a preset altitude threshold. The base station may determine whether the unmanned aerial vehicle is a lawful unmanned aerial vehicle or an unlawful unmanned aerial vehicle depending on whether the flight status information indicates that an altitude of the unmanned aerial vehicle from the ground is greater than or equal to a preset altitude threshold.

Exemplarily, the unmanned aerial vehicle may establish an RRC connection with the base station through a random access by a loaded special chip for an unmanned aerial vehicle based on cellular network. In this way, the unmanned aerial vehicle accesses the base station. After accessing the base station, the unmanned aerial vehicle may obtain a current altitude from the ground in real time, the altitude from the ground is the distance between the current unmanned aerial vehicle and the ground. After being powered on, the unmanned aerial vehicle can obtain the distance from the ground in real time, regardless of whether the unmanned aerial vehicle is currently stationary or in flight.

Optionally, the unmanned aerial vehicle may pre-store a preset altitude threshold. A distance sensor is disposed inside the unmanned aerial vehicle, and configured to measure the distance between the unmanned aerial vehicle and the ground. When the unmanned aerial vehicle obtains the current altitude from the ground through the distance sensor, and determines that the current altitude from the ground is greater than or equal to the preset altitude threshold, the flight status information is reported to the base station, which is configured to trigger an identity authentication process of the base station for the unmanned aerial vehicle. For example, when determining that the current altitude from the ground is greater than or equal to the preset altitude threshold, the unmanned aerial vehicle may send a first RRC signaling to the base station, the first RRC signaling including the flight status information. After receiving the first RRC signaling including the flight status information sent by the unmanned aerial vehicle, the base station may trigger the identity authentication process for the unmanned aerial vehicle.

In practical application, the preset altitude threshold may be set according to actual situation. For example, if the cell covered by the base station is an aviation restricted area, the preset altitude threshold may be set to a lower value, for example 3 m (meters), or even 0 m, that is, when the unmanned aerial vehicle operates in the aviation restricted area, the identity authentication process of the base station for the unmanned aerial vehicle can be triggered in time to prevent the unlawful unmanned aerial vehicle from flying in the cell covered by the current base station. If the cell covered by the base station is an ordinary cell, the preset altitude threshold may be set to a higher value, for example 200 m (meters), so that the public's entertainment needs for the unmanned aerial vehicle are guaranteed, meanwhile avoiding the impact on the aviation safety in higher areas caused by flight of the unlawful unmanned aerial vehicle.

Optionally, a core network may send a list of lawful unmanned aerial vehicles to each base station during initialization, and the list stores the identities of a plurality of lawful unmanned aerial vehicles. In addition, since the base station has established the RRC connection with the unmanned aerial vehicle, the base station can learn the identity of the unmanned aerial vehicle. When receiving the flight status information reported by the unmanned aerial vehicle, that is, when the flight altitude of the unmanned aerial vehicle is higher, the base station can query whether the list of lawful unmanned aerial vehicles includes the identity of such unmanned aerial vehicle. If the list includes the identity of the unmanned aerial vehicle, it is indicated that the unmanned aerial vehicle is a lawful unmanned aerial vehicle. If the list does not include the identity of the unmanned aerial vehicle, it is indicated that the unmanned aerial vehicle is an unlawful unmanned aerial vehicle.

In step 202, in response to the unmanned aerial vehicle being the lawful unmanned aerial vehicle, a communication service is provided for the unmanned aerial vehicle.

Exemplarily, if the list of lawful unmanned aerial vehicles pre-stored by the base station includes the identity of the unmanned aerial vehicle, the base station may continue to provide the communication service for the unmanned aerial vehicle. The communication service includes forwarding various control instructions sent by the control terminal to the unmanned aerial vehicle, or forwarding various data and various feedback information sent by the unmanned aerial vehicle to the control terminal, and forwarding the data sent by the unmanned aerial vehicle to a preset server in the cellular network, etc., which is not limited by the embodiment of the present disclosure.

In step 203, in response to the unmanned aerial vehicle being the unlawful unmanned aerial vehicle, the communication service for the unmanned aerial vehicle is stopped.

Exemplarily, if the list of lawful unmanned aerial vehicles pre-stored by the base station does not include the identity of the unmanned aerial vehicle, that is, the unmanned aerial vehicle is the unlawful unmanned aerial vehicle, the base station can stop the provision of the communication service for the unmanned aerial vehicle at this time. For example, the base station may release the RRC connection of the unmanned aerial vehicle, or directly discard the data packets sent to the unmanned aerial vehicle or sent from the unmanned aerial vehicle.

In actual application, upon determining that the unmanned aerial vehicle is the unlawful unmanned aerial vehicle, the base station may generate prompt information and further send the prompt information to the control terminal of the unmanned aerial vehicle. The prompt information is configured to prompt a user base station to stop the provision of the communication service for the unlawful unmanned aerial vehicle. After receiving the prompt information, the control terminal can display a word "the current base station stops the communication service" on the screen, and remind the user of checking by means of vibrating or ringing, thereby preventing the unmanned aerial vehicle from failing out of control and bringing property damage to the user.

In the technical solution provided by the embodiment of the present disclosure, the base station may determine whether the unmanned aerial vehicle currently in a flight status is a lawful unmanned aerial vehicle or an unlawful unmanned aerial vehicle, further provide the communication service in response to the unmanned aerial vehicle being the lawful unmanned aerial vehicle and stop the provision of the communication service in response to the unmanned aerial vehicle being the unlawful unmanned aerial vehicle, thereby providing supervision for the unmanned aerial vehicle, improving the flight safety and facilitating the long-term development of the unmanned aerial vehicle.

Figure 2B:
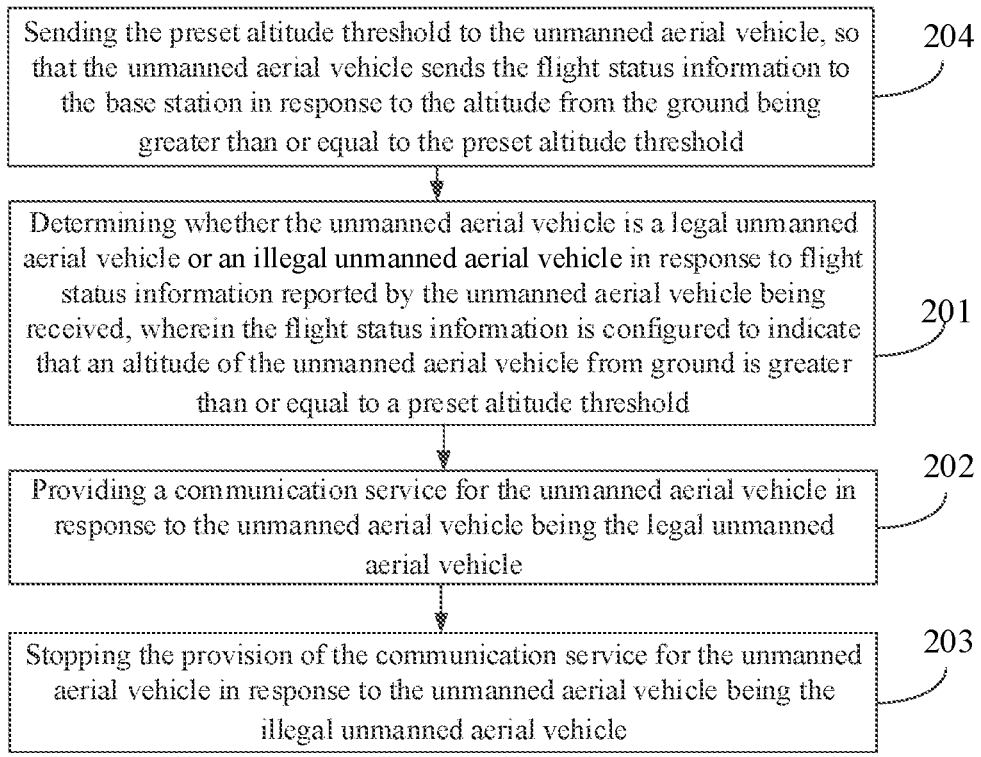
FIG. 2B is a flowchart of an unmanned aerial vehicle authentication method according to an exemplary embodiment.

In one embodiment, as shown in FIG. 2B, the method further includes step 204:

In step 204, the preset altitude threshold is sent to the unmanned aerial vehicle, so that the unmanned aerial vehicle sends the flight status information to the base station in response to the altitude from the ground being greater than or equal to the preset altitude threshold.

Exemplarily, the base station may configure the preset altitude threshold for the unmanned aerial vehicle according to specific conditions. For example, if there are more flights over the cell covered by the base station in a preset time period from the current time, the preset altitude threshold in the preset time period may be set to a lower value to avoid the impact on flight safety since the unmanned aerial vehicle flies too high. If there is no flight over the cell covered by the base station within the preset time period from the current time, the preset altitude threshold within the preset time period may be set to a higher value to guarantee public's entertainment needs for the unmanned aerial vehicle.

Optionally, after the preset altitude threshold is configured according to the actual situation, the base station may generate threshold information according to the preset altitude threshold, and send the threshold information in a broadcast form. After receiving the threshold information through a broadcast channel, the unmanned aerial vehicle may obtain and save the preset altitude threshold included in the threshold information, so as to determine whether the flight status information needs to be reported to the base station in time. Other terminals that are not unmanned aerial vehicles in the cell can directly discard the threshold information upon receiving it.

Alternatively, after the preset altitude threshold is configured according to the actual situation, the base station may generate a second RRC signaling according to the preset altitude threshold, and further send the second RRC signaling to the unmanned aerial vehicle through an RRC channel. Upon receiving the second RRC signaling the URC channel, the unmanned aerial vehicle may obtain and save the preset altitude threshold included in the second RRC signaling, so as to determine whether the flight status information needs to be reported to the base station in time.

In the technical solution provided by the embodiments of the present disclosure, the base station may send the preset altitude threshold to the unmanned aerial vehicle, so that the unmanned aerial vehicle may send the flight status information to the base station when it is determined to be in the flight status according to the preset altitude threshold, thereby avoiding the waste of resources caused by the fact that the base station performs identity authentication on the unmanned aerial vehicle not in the flight status.

Figure 2C:
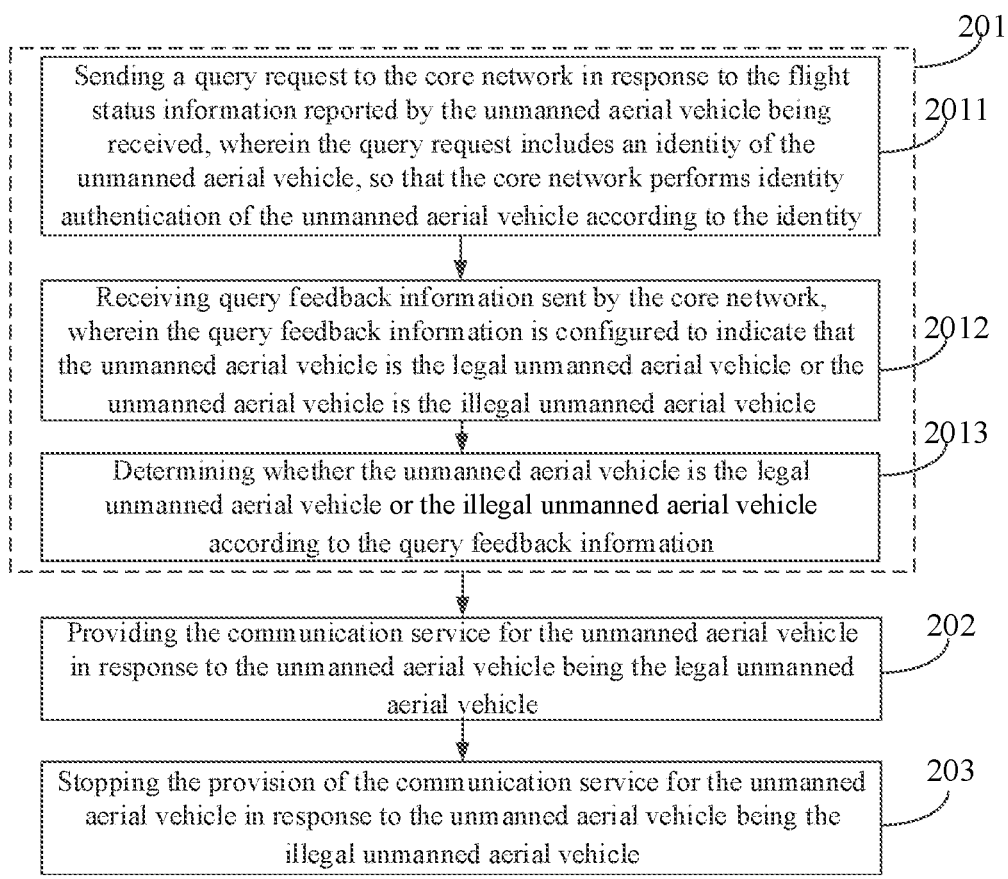
FIG. 2C is a flowchart of an unmanned aerial vehicle authentication method according to an exemplary embodiment.

In one embodiment, as shown in FIG. 2C, in step 201, determining whether the unmanned aerial vehicle is a lawful unmanned aerial vehicle or an unlawful unmanned aerial vehicle in response to the flight status information reported by the unmanned aerial vehicle being received may be achieved by steps 2011 to 2013:

In step 2011, a query request is sent to the core network in response to the flight status information reported by the unmanned aerial vehicle being received, and the query request includes an identity of the unmanned aerial vehicle, so that the core network performs identity authentication of the unmanned aerial vehicle according to the identity.

Exemplarily, due to the limited storage capacity of the base station, if the identities of the lawful unmanned aerial vehicles produced by each manufacturer are stored in the list of lawful unmanned aerial vehicles and further stored by the base station, a larger storage space of the base station may be occupied, which will affect functions of the base station. Therefore, the list of lawful unmanned aerial vehicles may be stored in an identity authentication server included in the core network. The identity authentication server may be a server provided by the unmanned aerial vehicle manufacturer, or a server provided by an operator, or a server provided by a third-party authentication platform, which is not limited in the embodiment of the present disclosure.

Figure 2D:
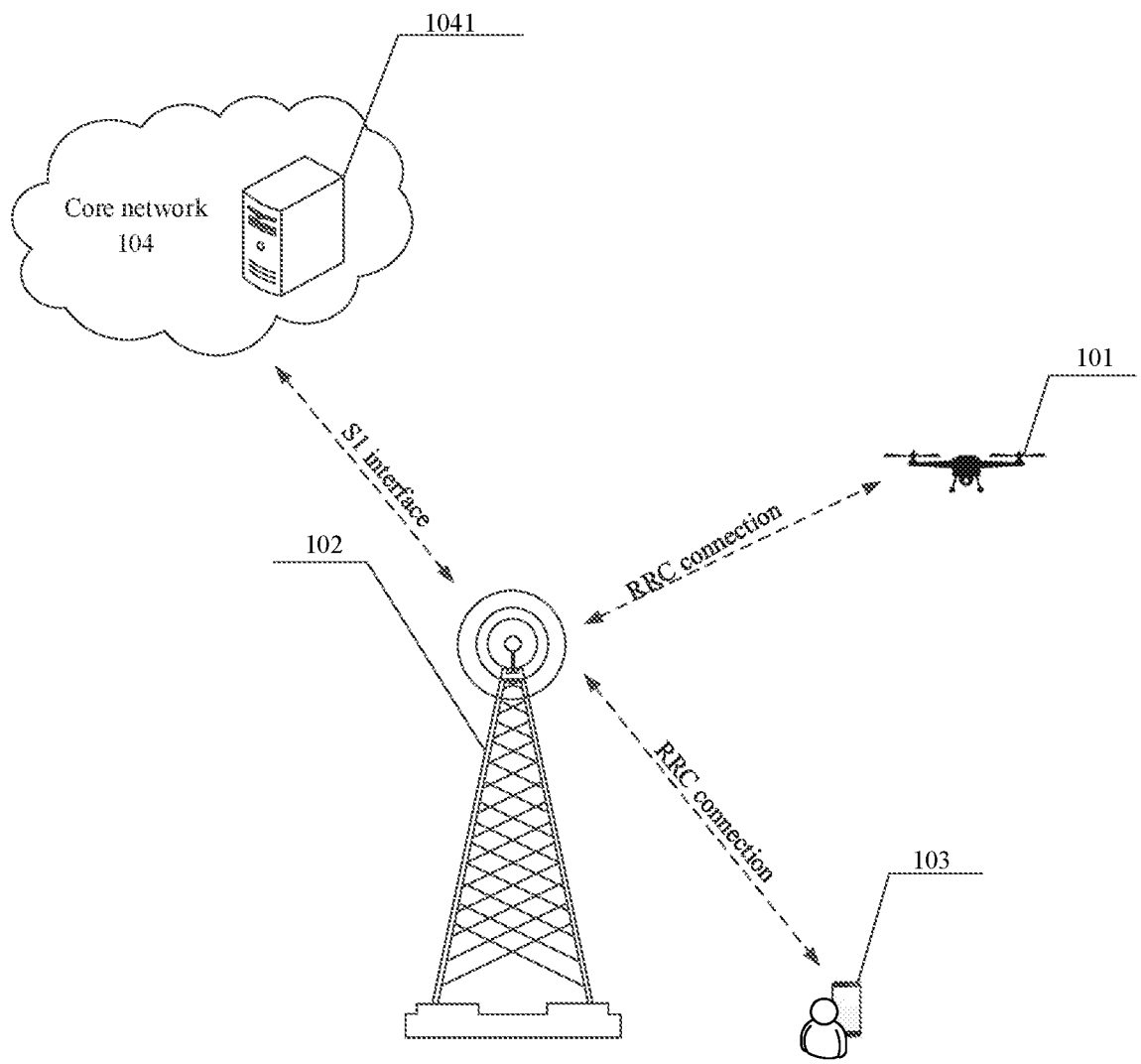
FIG. 2D is a scenario diagram of applying an unmanned aerial vehicle authentication method according to an exemplary embodiment.

The scenario for applying the technical solution is as shown in FIG. 2D. The unmanned aerial vehicle 101 establishes the RRC connection with the base station 102 through the loaded special chip for an unmanned aerial vehicle base on cellular network, and the control terminal 103 can establish the RRC connection with the base station through the loaded SIM card. The base station 102 is connected to the core network 104 via the cellular network, and an identity authentication server 1041 is connected in the core network 104.

When receiving the flight status information reported by the unmanned aerial vehicle 101, the base station 102 may send the query request to the core network 104 through an interface connected to the core network 104, the query request includes the identity of the unmanned aerial vehicle 101. For example, the base station 102 may send a first S1-AP signaling to the core network 104 through the S1 interface, the first S1-AP signaling includes the query request. After receiving the first S1-AP signaling, the core network 104 may obtain the identity of the unmanned aerial vehicle 101 included in the query request in the first S1-AP signaling, then query the list of lawful unmanned aerial vehicles stored in the identity authentication server 1041, and generate query feedback information according to the query result, and further send the query feedback information to the base station 102. For example, the core network 104 may send a second S1-AP signaling to the base station 102 through the S1 interface connected to the base station 102, the second S1-AP signaling including the query feedback information.

In step 2012, the query feedback information sent by the core network is received, and the query feedback information is configured to indicate that the unmanned aerial vehicle is a lawful unmanned aerial vehicle or the unmanned aerial vehicle is an unlawful unmanned aerial vehicle.

In step 2013, it is determined whether the unmanned aerial vehicle is a lawful unmanned aerial vehicle or an unlawful unmanned aerial vehicle according to the query feedback information.

Exemplarily, referring to FIG. 2D, after receiving the second S1-AP signaling sent by the core network 104 through the S1 interface, the base station 102 obtains the query feedback information included in the second S1-AP signaling, and then determines, according to the query feedback information, whether the unmanned aerial vehicle 101 is the lawful unmanned aerial vehicle or the unlawful unmanned aerial vehicle.

Optionally, the base station 102 and the core network 104 may agree on a preset lawful identification and a preset unlawful identification during initialization. If the core network 104 confirms that the list of lawful unmanned aerial vehicles includes the identity of the unmanned aerial vehicle 101 after querying the list of lawful unmanned aerial vehicles stored by the identity authentication server 1041, the core network 104 may generate the query feedback information including the preset lawful identification and send it to the base station 102. If the core network 104 confirms that the list of lawful unmanned aerial vehicles does not include the identity of the unmanned aerial vehicle 101, the core network 104 may generate the query feedback information including the preset unlawful identification and send it to the base station 102.

After receiving the query feedback information sent by the core network 104, the base station 102 may obtain the content included in the query feedback information. If the query feedback information includes the preset lawful identification, it can be confirmed that the unmanned aerial vehicle 101 is the lawful unmanned aerial vehicle. If the query feedback information includes the preset unlawful identification, it can be confirmed that the unmanned aerial vehicle 101 is the unlawful unmanned aerial vehicle.

In the technical solution provided by the embodiment of the present disclosure, since more information is stored in the core network, the base station performs identity authentication on the unmanned aerial vehicle via the core network, thereby improving the efficiency and accuracy of the identity authentication of the unmanned aerial vehicle and also improving the authentication success rate of the unmanned aerial vehicle.

Unmanned Aerial Vehicle Side

Figure 3A:
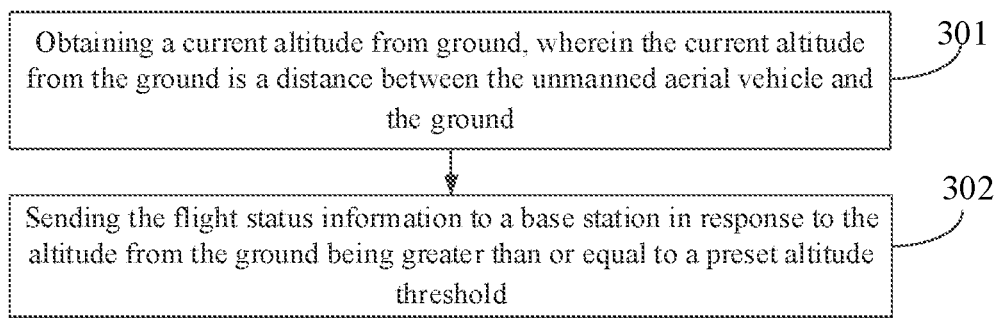
FIG. 3A is a flowchart of an unmanned aerial vehicle authentication method according to an exemplary embodiment.

FIG. 3A is a flowchart of an unmanned aerial vehicle authentication method according to an exemplary embodiment. The method is implemented by an unmanned aerial vehicle. As shown in FIG. 3A, the unmanned aerial vehicle authentication method includes following steps 301 to 302:

In step 301, a current altitude from ground is obtained, and the current altitude from the ground is the distance between the unmanned aerial vehicle and the ground.

Exemplarily, a distance sensor may be disposed inside the unmanned aerial vehicle, the distance between the unmanned aerial vehicle and the ground can be measured via the distance sensor. Alternatively, the unmanned aerial vehicle may also obtain the distance between the current position and the ground by collecting a ratio between the size of a standard substance on the ground in the image and the original size of the standard substance at the current position.

In step 302, the flight status information is sent to the base station in response to the altitude from the ground being greater than or equal to a preset altitude threshold.

Exemplarily, the unmanned aerial vehicle may pre-store the preset altitude threshold. When determining that the current altitude from the ground is greater than or equal to the preset altitude threshold, the unmanned aerial vehicle reports the flight status information to the base station, and then the identity authentication process of the base station for the unmanned aerial vehicle is triggered by sending the flight status information. For example, when determining that the current altitude from the ground is greater than or equal to the preset altitude threshold, the unmanned aerial vehicle sends a first RRC signaling to the base station, the first RRC signaling including the flight status information. After receiving the first RRC signaling sent by the unmanned aerial vehicle, the base station can trigger the identity authentication process for the unmanned aerial vehicle.

In practical application, the preset altitude threshold may be set according to the actual situation. For example, if the cell covered by the base station is an aviation restricted area, the preset altitude threshold may be set to a lower value, for example 3 m (meters), or even 0 m, that is, the identity authentication process of the base station for the unmanned aerial vehicle can be triggered in time when the unmanned aerial vehicle operates in the aviation restricted area, and the unlawful unmanned aerial vehicle is prevented from flying in the cell covered by the current base station. If the cell covered by the base station is an ordinary cell, the preset altitude threshold may be set to a higher value, for example 200 m (meters), so that the public's entertainment needs for the unmanned aerial vehicle are guaranteed, meanwhile avoiding the impact on the aviation safety in higher areas caused by the flight of the unlawful unmanned aerial vehicle.

In the technical solution provided by the embodiment of the present disclosure, the unmanned aerial vehicle can send the flight status information to the base station according to the current altitude from the ground, so that the base station can determine whether the unmanned aerial vehicle currently in a flight status is a lawful unmanned aerial vehicle or an unlawful unmanned aerial vehicle according to the flight status information, further only provide the communication service for the lawful unmanned aerial vehicle and stop the provision of the communication service in response to the unmanned aerial vehicle being the unlawful unmanned aerial vehicle, thereby providing supervision for the unmanned aerial vehicle, improving the flight safety and facilitating the long-term development of the unmanned aerial vehicle.

Figure 3B:
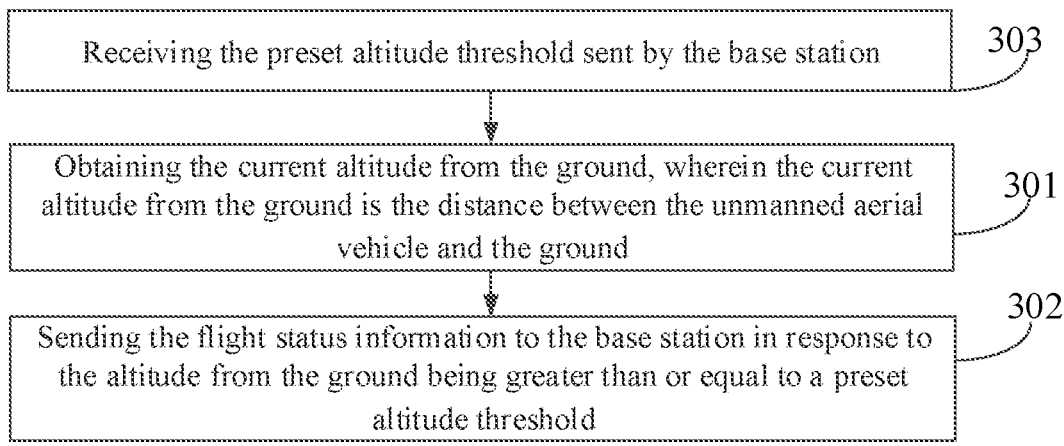
FIG. 3B is a flowchart of an unmanned aerial vehicle authentication method according to an exemplary embodiment.

In one embodiment, as shown in FIG. 3B, the method further includes step 303:

In step 303, the preset altitude threshold sent by the base station is received.

Exemplarily, the base station may configure the preset altitude threshold for the unmanned aerial vehicle according to specific conditions. For example, if there are more flights over the cell covered by the base station in a preset time period from the current time, the preset altitude threshold in the preset time period may be set to a lower value to avoid the impact on flight safety since the unmanned aerial vehicle flies too high. If there is no flight over the cell covered by the base station within the preset time period from the current time, the preset altitude threshold within the preset time period may be set to a higher value to guarantee public's entertainment needs for the unmanned aerial vehicle.

Optionally, after the preset altitude threshold is configured according to the actual situation, the base station may generate threshold information according to the preset altitude threshold, and send the threshold information in a broadcast form. After receiving the threshold information through a broadcast channel, the unmanned aerial vehicle may obtain and save the preset altitude threshold included in the threshold information.

Alternatively, after the preset altitude threshold is configured according to the actual situation, the base station may generate a second RRC signaling according to the preset altitude threshold, and further send the second RRC signaling to the unmanned aerial vehicle through an RRC channel. Upon receiving the second RRC signaling, the unmanned aerial vehicle may obtain and save the preset altitude threshold included in the second RRC signaling.

In the technical solution provided by the embodiment of the present disclosure, the unmanned aerial vehicle can receive the preset altitude threshold sent by the base station and send the flight status information to the base station when it is determined to be in the flight status according to the preset altitude threshold, thereby avoiding the waste of resources caused by the fact that the base station performs identity authentication on the unmanned aerial vehicle not in the flight status.

The following describes the technical solution in the present embodiment with specific embodiments.

Detailed Embodiment 1

Figure 4:
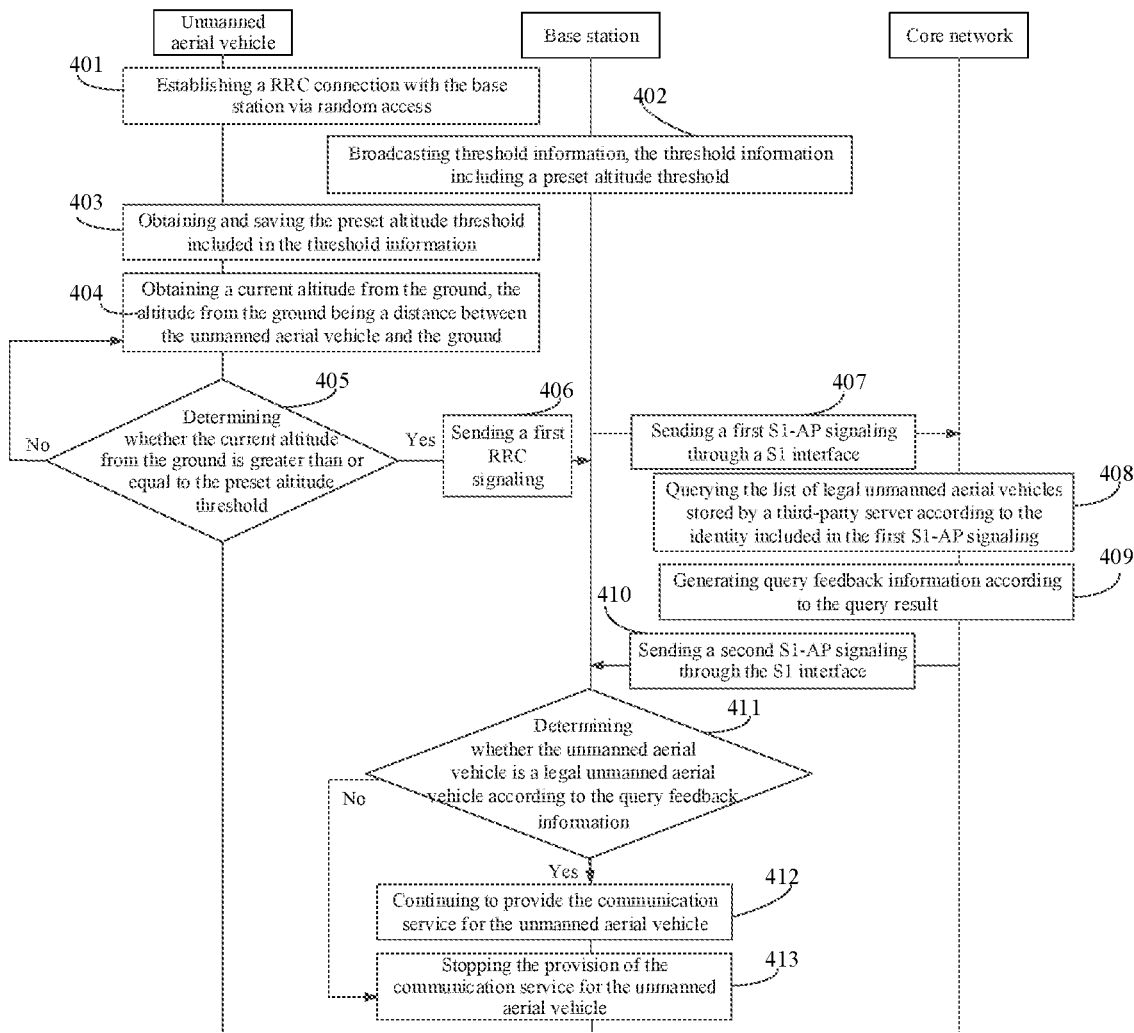
FIG. 4 is an interaction diagram of an unmanned aerial vehicle authentication method according to an exemplary embodiment.

FIG. 4 is an interaction diagram of an unmanned aerial vehicle authentication method according to an exemplary embodiment, which is suitable to the unmanned aerial vehicle, the base station, and the core network shown in FIG. 2D. As shown in FIG. 4, the unmanned aerial vehicle authentication method includes following steps 401 to 413:

In step 401, the unmanned aerial vehicle establishes a RRC connection with the base station via random access.

In step 402, the base station broadcasts threshold information, the threshold information including a preset altitude threshold.

In step 403, the unmanned aerial vehicle obtains and saves the preset altitude threshold included in the threshold information.

In step 404, the unmanned aerial vehicle obtains a current altitude from the ground, the altitude from the ground being a distance between the unmanned aerial vehicle and the ground.

In step 405, the unmanned aerial vehicle determines whether the current altitude from the ground is greater than or equal to the preset altitude threshold; if the current altitude from the ground is greater than or equal to the preset altitude threshold, step 406 is performed; and if the altitude from the ground is less than the preset altitude threshold, step 404 is performed.

In step 406, a first RRC signaling is sent to the base station, the first RRC signaling including flight status information.

In step 407, when determining that the flight status information reported by the unmanned aerial vehicle is received, the base station sends a first S1-AP signaling to the core network through a S1 interface, the first S1-AP signaling including a query request.

In step 408, the core network queries the list of lawful unmanned aerial vehicles stored by a third-party server according to the identity included in the first S1-AP signaling.

In step 409, the core network generates query feedback information according to the query result.

In step 410, the core network sends a second S1-AP signaling to the base station through the S1 interface, the second S1-AP signaling including the query feedback information.

In step 411, the base station determines whether the unmanned aerial vehicle is a lawful unmanned aerial vehicle or an unlawful unmanned aerial vehicle according to the query feedback information; if the unmanned aerial vehicle is the lawful unmanned aerial vehicle, step 412 is performed; and if the unmanned aerial vehicle is the unlawful unmanned aerial vehicle, step 413 is performed.

In step 412, the communication service is continuously provided for the unmanned aerial vehicle.

In step 413, the provision of the communication service for the unmanned aerial vehicle is stopped.

The embodiment of the present disclosure provides an unmanned aerial vehicle authentication method. The base station can determine whether the unmanned aerial vehicle currently in a flight status is a lawful unmanned aerial vehicle or an unlawful unmanned aerial vehicle, further provide the communication service in response to the unmanned aerial vehicle being the lawful unmanned aerial vehicle and stop the provision of the communication service in response to the unmanned aerial vehicle being the unlawful unmanned aerial vehicle, thereby providing supervision for the unmanned aerial vehicle, improving the flight safety and facilitating the long-term development of the unmanned aerial vehicle.

Detailed Embodiment 2

Figure 5:
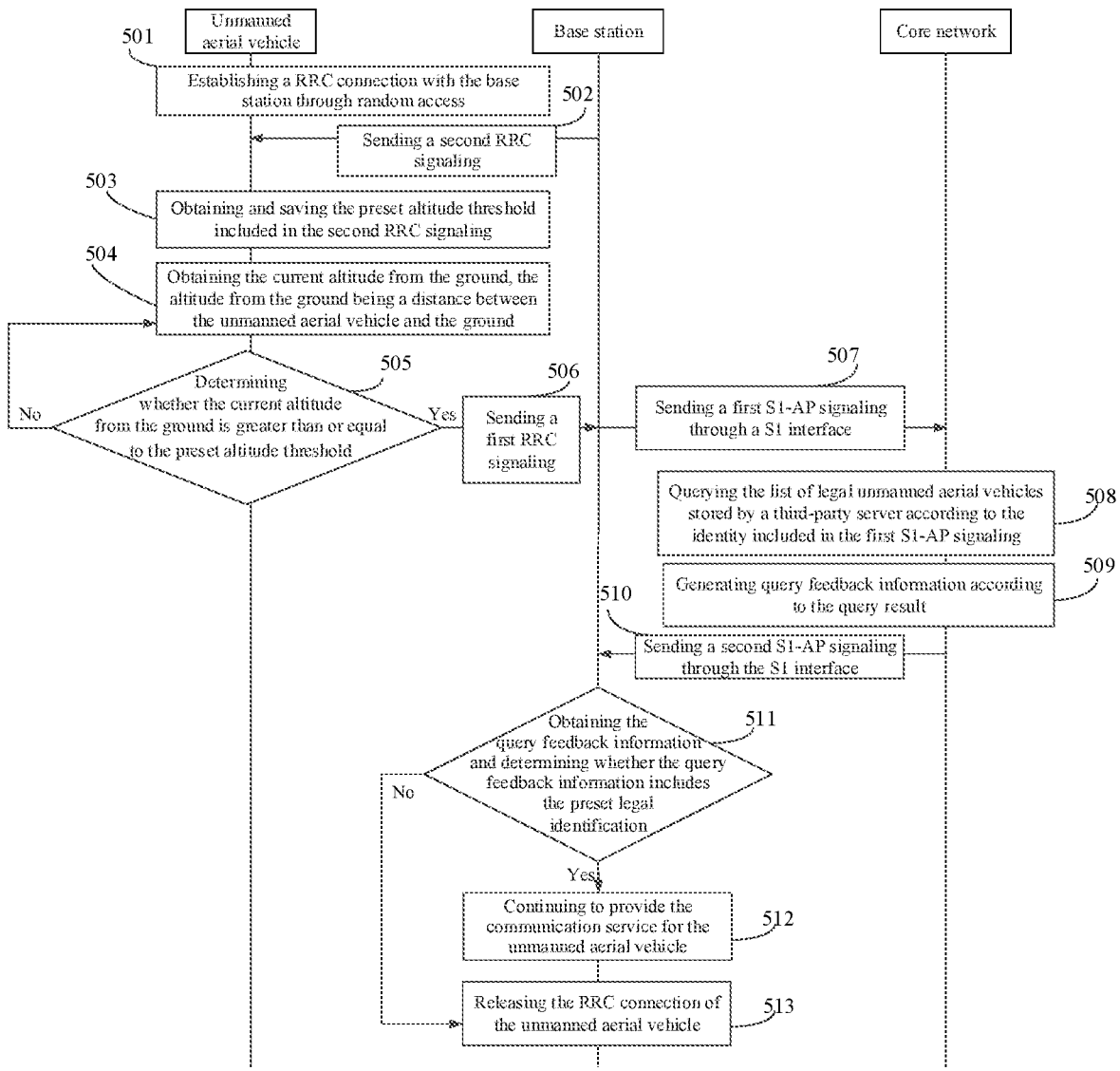
FIG. 5 is an interaction diagram of an unmanned aerial vehicle authentication method according to an exemplary embodiment.

FIG. 5 is an interaction diagram of an unmanned aerial vehicle authentication method according to an exemplary embodiment, which is suitable to the unmanned aerial vehicle, the base station, and the core network shown in FIG. 2D. As shown in FIG. 5, the unmanned aerial vehicle authentication method includes the following steps 501 to 513:

In step 501, the unmanned aerial vehicle establishes a RRC connection with the base station through random access.

In step 502, the base station sends a second RRC signaling to the unmanned aerial vehicle, the second RRC signaling including a preset altitude threshold.

In step 503, the unmanned aerial vehicle obtains and saves the preset altitude threshold included in the second RRC signaling.

In step 504, the unmanned aerial vehicle obtains a current altitude from the ground, the altitude from the ground being a distance between the unmanned aerial vehicle and the ground.

In step 505, the unmanned aerial vehicle determines whether the current altitude from the ground is greater than or equal to the preset altitude threshold; if the current altitude from the ground is greater than or equal to the preset altitude threshold, step 506 is performed; and if the ground altitude is less than the preset altitude threshold, step 504 is performed.

In step 506, a first RRC signaling is sent to the base station, the first RRC signaling including flight status information.

In step 507, when determining that the flight status information reported by the unmanned aerial vehicle is received, the base station sends a first S1-AP signaling to the core network through a S1 interface, the first S1-AP signaling including a query request.

In step 508, the core network queries the list of lawful unmanned aerial vehicles stored by a third-party server according to the identity.

The list of lawful unmanned aerial vehicles stores the identities of a plurality of lawful unmanned aerial vehicles.

In step 509, the core network generates query feedback information according to the query result.

If the list of lawful unmanned aerial vehicles includes the identity of the unmanned aerial vehicle, the query feedback information includes a preset lawful identification; and if the list of lawful unmanned aerial vehicles does not include the identity of the unmanned aerial vehicle, the query feedback information includes a preset unlawful identification.

In step 510, the core network sends a second S1-AP signaling to the base station through the S1 interface, the second S1-AP signaling including the query feedback information.

In step 511, the base station obtains the query feedback information and determines whether the query feedback information includes the preset lawful identification or the preset unlawful identification; if the query feedback information includes the preset lawful identification, step 512 is performed; and if the query feedback information includes the preset unlawful identification, step 513 is performed.

In step 512, the communication service is continuously provided for the unmanned aerial vehicle.

In step 513, the RRC connection of the unmanned aerial vehicle is released.

The embodiment of the present disclosure provides an unmanned aerial vehicle authentication method. The base station can determine whether the unmanned aerial vehicle currently in a flight status is a lawful unmanned aerial vehicle or an unlawful unmanned aerial vehicle, further provide the communication service in response to the unmanned aerial vehicle being the lawful unmanned aerial vehicle and stop the provision of the communication service in response to the unmanned aerial vehicle being the unlawful unmanned aerial vehicle, thereby providing supervision for the unmanned aerial vehicle, improving the flight safety and facilitating the long-term development of the unmanned aerial vehicle.

The following is apparatus embodiments of the present disclosure, which may be configured to implement the method embodiments of the present disclosure.

Figure 6A:
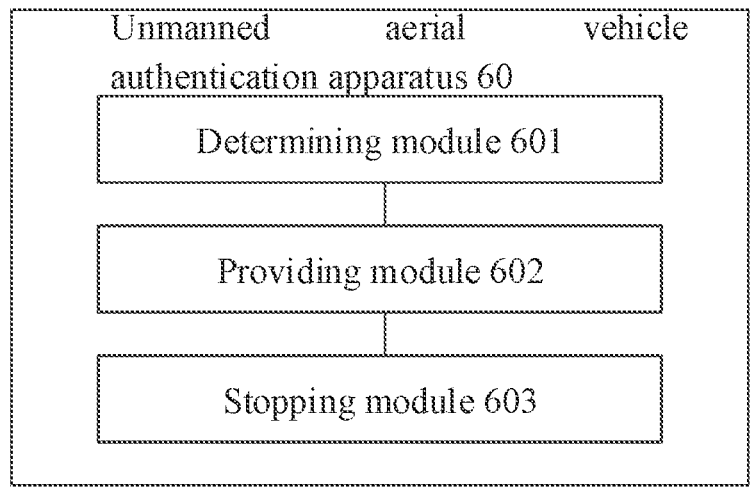
FIG. 6A is a schematic structural diagram of an unmanned aerial vehicle authentication apparatus according to an exemplary embodiment.

FIG. 6A is a block diagram of an unmanned aerial vehicle authentication apparatus 60 according to an exemplary embodiment. The apparatus 60 may be implemented as part or all of an electronic device via software, hardware, or a combination of both. As shown in FIG. 6A, the unmanned aerial vehicle authentication apparatus 60 includes a determining module 601, a providing module 602, and a stopping module 603.

The determining module 601 is configured to determine whether the unmanned aerial vehicle is a lawful unmanned aerial vehicle or an unlawful unmanned aerial vehicle in response to flight status information reported by the unmanned aerial vehicle being received, wherein the flight status information is configured to indicate that an altitude of the unmanned aerial vehicle from the ground is greater than or equal to a preset altitude threshold.

The providing module 602 is configured to provide a communication service for the unmanned aerial vehicle in response to the unmanned aerial vehicle being the lawful unmanned aerial vehicle.

The stopping module 630 is configured to stop the provision of the communication service for the unmanned aerial vehicle in response to the unmanned aerial vehicle being the unlawful unmanned aerial vehicle.

Figure 6B:
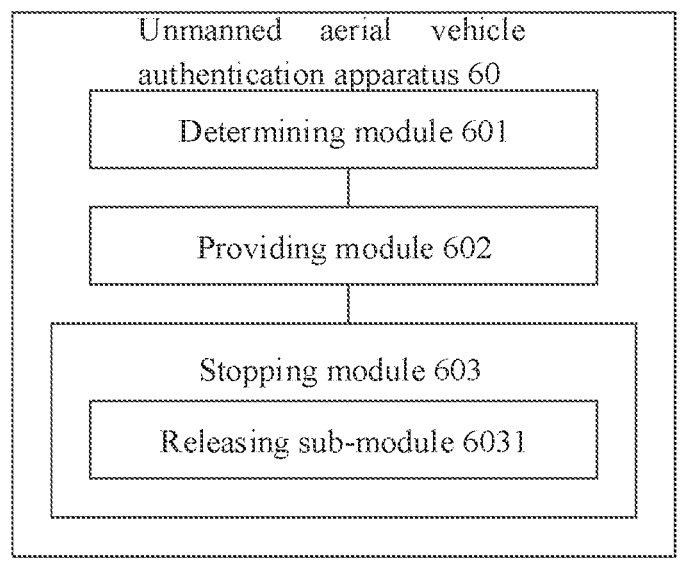
FIG. 6B is a schematic structural diagram of an unmanned aerial vehicle authentication apparatus according to an exemplary embodiment.

In one embodiment, as shown in FIG. 6B, the stopping module 603 includes a releasing sub-module 6031 configured to release a radio resource control (RRC) connection of the unmanned aerial vehicle in response to the unmanned aerial vehicle being the unlawful unmanned aerial vehicle.

Figure 6C:
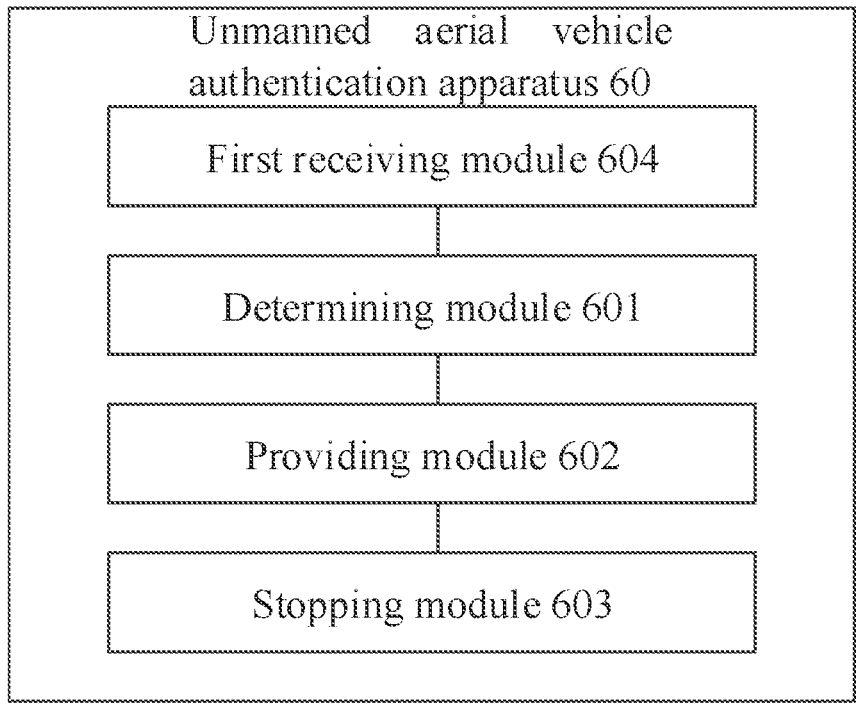
FIG. 6C is a schematic structural diagram of an unmanned aerial vehicle authentication apparatus according to an exemplary embodiment.

In one embodiment, as shown in FIG. 6C, the apparatus 60 further includes a first receiving module 604 configured to receive a first RRC signaling sent by the unmanned aerial vehicle, wherein the first RRC signaling includes the flight status information.

Figure 6D:
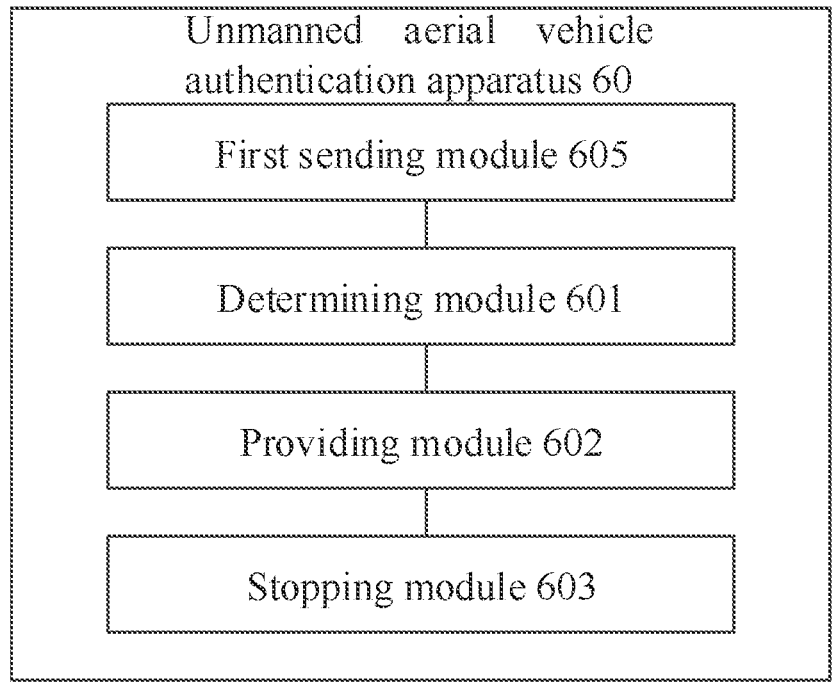
FIG. 6D is a schematic structural diagram of an unmanned aerial vehicle authentication apparatus according to an exemplary embodiment.

In one embodiment, as shown in FIG. 6D, the apparatus 60 further includes a first sending module 605 configured to send the preset altitude threshold to the unmanned aerial vehicle, so that the unmanned aerial vehicle sends the flight status information to the base station in response to the altitude from the ground being greater than or equal to the preset altitude threshold.

Figure 6E:
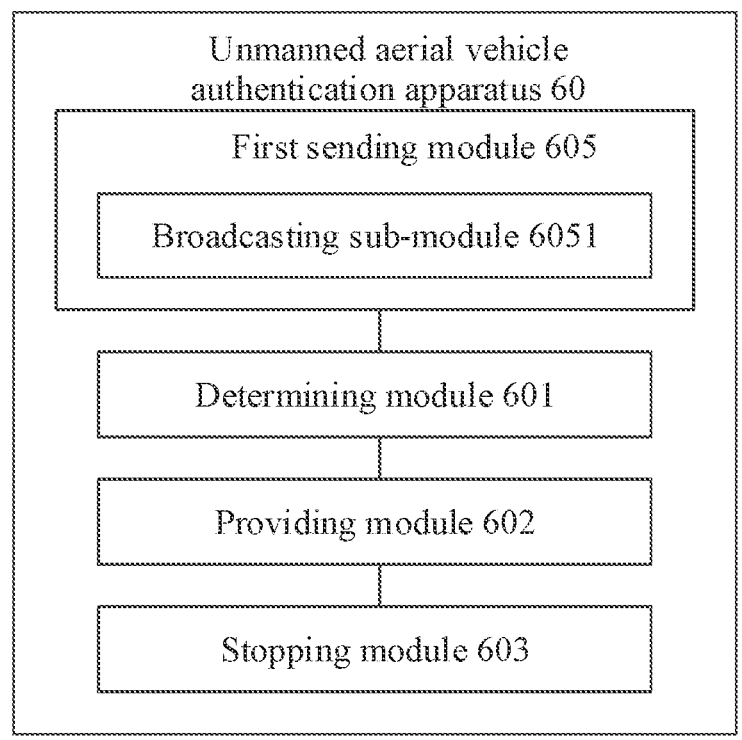
FIG. 6E is a schematic structural diagram of an unmanned aerial vehicle authentication apparatus according to an exemplary embodiment.

In one embodiment, as shown in FIG. 6E, the first sending module 605 includes a broadcasting sub-module 6051 configured to broadcast threshold information, the threshold information including the preset altitude threshold.

Figure 6F:
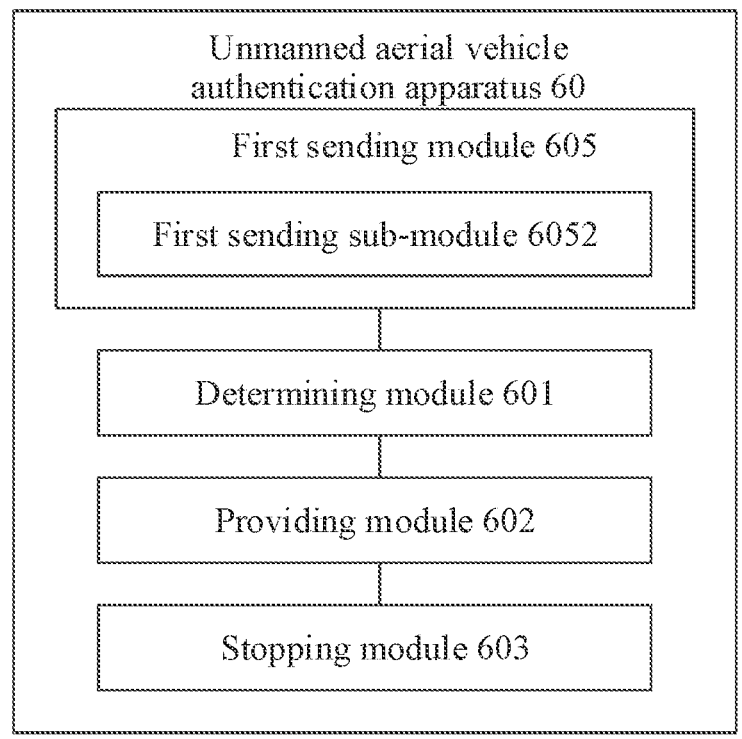
FIG. 6F is a schematic structural diagram of an unmanned aerial vehicle authentication apparatus according to an exemplary embodiment.

In one embodiment, as shown in FIG. 6F, the first sending module 605 includes a first sending sub-module 6052 configured to send a second RRC signaling to the unmanned aerial vehicle, the second RRC signaling including the preset altitude threshold.

Figure 6G:
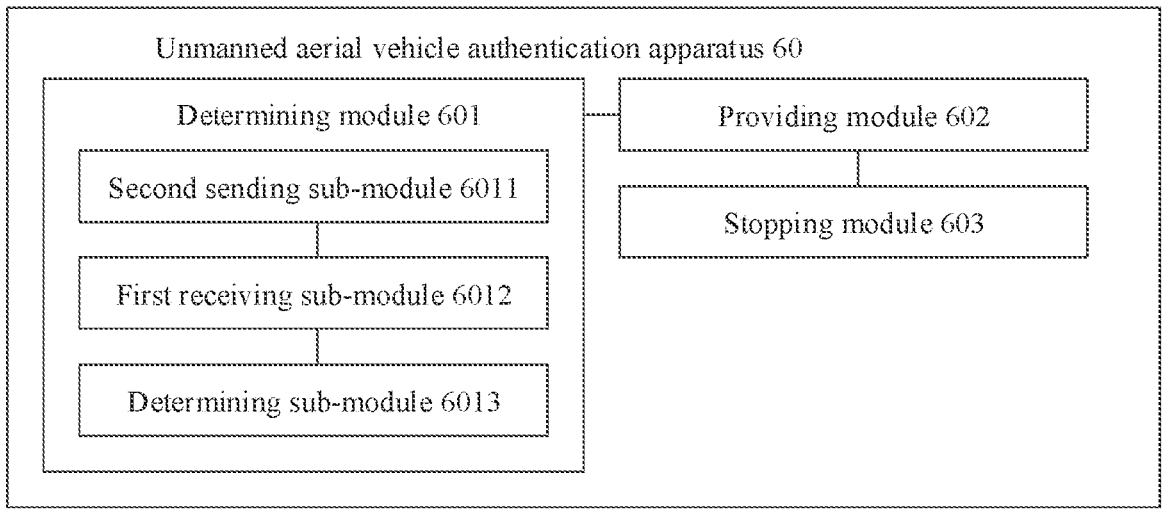
FIG. 6G is a schematic structural diagram of an unmanned aerial vehicle authentication apparatus according to an exemplary embodiment.

In one embodiment, as shown in FIG. 6G, the determining module 601 includes a second sending sub-module 6011, a first receiving sub-module 6012 and a determining sub-module 6013.

The second sending sub-module 6011 is configured to send a query request to a core network in response to the flight status information reported by the unmanned aerial vehicle being received, wherein the query request includes an identity of the unmanned aerial vehicle, so that the core network performs identity authentication of the unmanned aerial vehicle according to the identity.

The first receiving sub-module 6012 is configured to receive query feedback information sent by the core network, wherein the query feedback information is configured to indicate that the unmanned aerial vehicle is the lawful unmanned aerial vehicle or the unmanned aerial vehicle is the unlawful unmanned aerial vehicle.

The determining sub-module 6013 is configured to determine whether the unmanned aerial vehicle is the lawful unmanned aerial vehicle or the unlawful unmanned aerial vehicle according to the query feedback information.

Figure 6H:
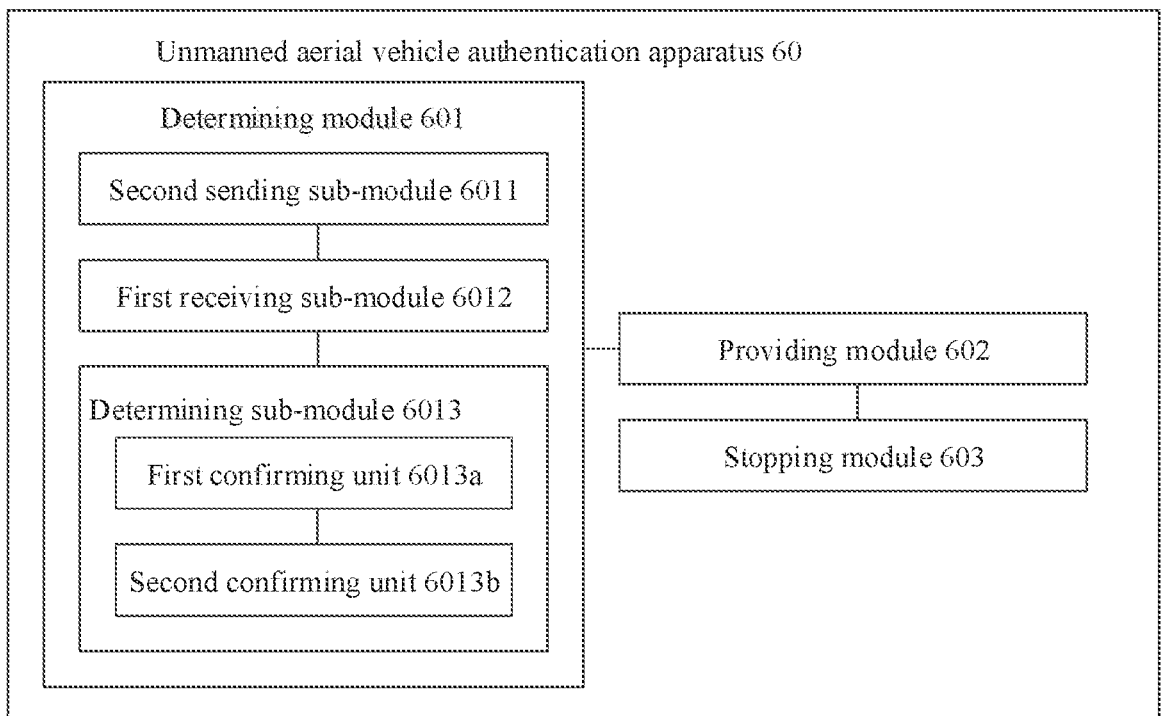
FIG. 6H is a schematic structural diagram of an unmanned aerial vehicle authentication apparatus according to an exemplary embodiment.

In one embodiment, as shown in FIG. 6H, the determining sub-module 6013 includes a first confirming unit 6013a and a second confirming unit 6013b.

The first confirming unit 6013a is configured to confirm that the unmanned aerial vehicle is the lawful unmanned aerial vehicle in response to the query feedback information including a preset lawful identification.

The second confirming unit 6013b is configured to confirm that the unmanned aerial vehicle is the unlawful unmanned aerial vehicle in response to the query feedback information including a preset unlawful identification.

Figure 6I:
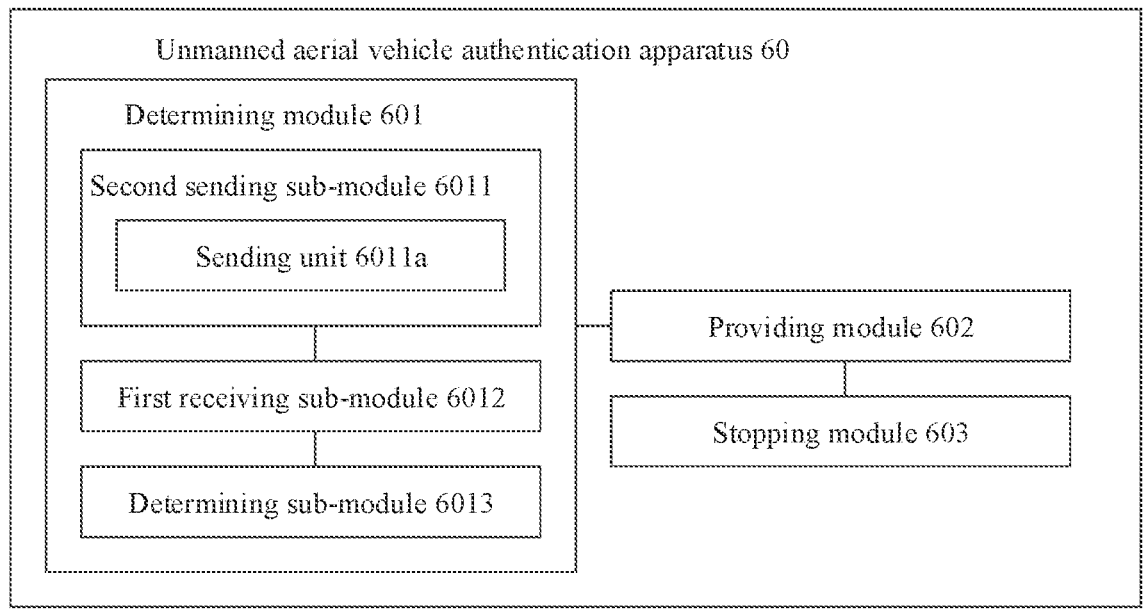
FIG. 6I is a schematic structural diagram of an unmanned aerial vehicle authentication apparatus according to an exemplary embodiment.

In one embodiment, as shown in FIG. 6I, the second sending sub-module 6011 includes a sending unit 6011a configured to send a first S1-AP signaling to the core network through a S1 interface, the first S1-AP signaling including the query request.

Figure 6J:
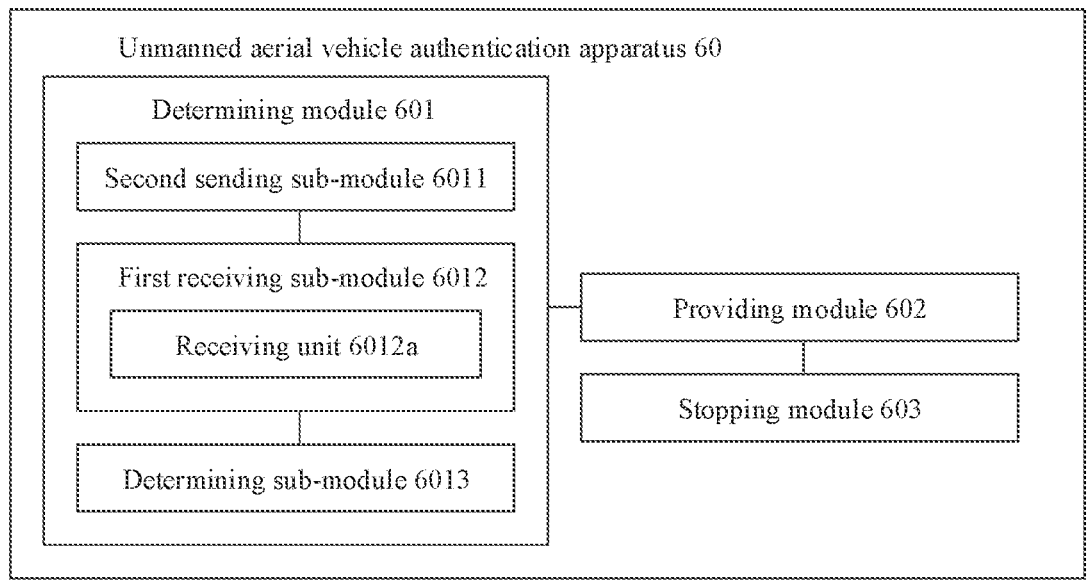
FIG. 6J is a schematic structural diagram of an unmanned aerial vehicle authentication apparatus according to an exemplary embodiment.

In one embodiment, as shown in FIG. 6J, the first receiving sub-module 6012 includes a receiving unit 6012a configured to receive a second S1-AP signaling sent by the core network through the S1 interface, the second S1-AP signaling including the query feedback information.

The embodiment of the present disclosure provides an unmanned aerial vehicle authentication apparatus. The apparatus can determine whether the unmanned aerial vehicle currently in a flight status is a lawful unmanned aerial vehicle or an unlawful unmanned aerial vehicle, further provide the communication service in response to the unmanned aerial vehicle being the lawful unmanned aerial vehicle and stop the provision of the communication service in response to the unmanned aerial vehicle being the unlawful unmanned aerial vehicle, thereby providing supervision for the unmanned aerial vehicle, improving the flight safety and facilitating the long-term development of the unmanned aerial vehicle.

Figure 7A:
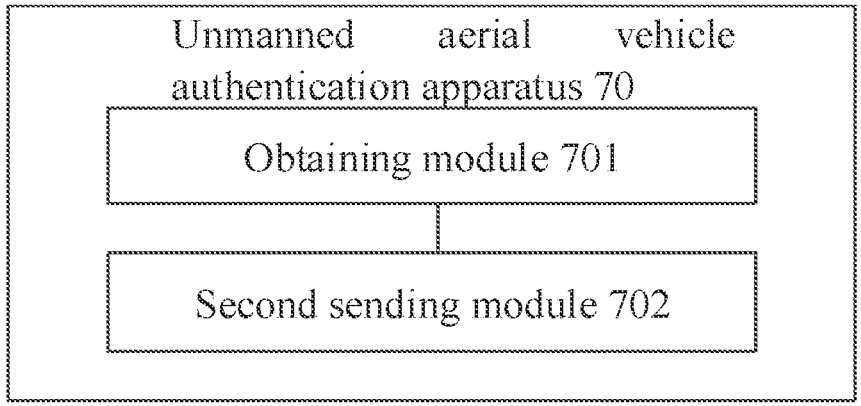
FIG. 7A is a schematic structural diagram of an unmanned aerial vehicle authentication apparatus according to an exemplary embodiment.

FIG. 7A is a block diagram of an unmanned aerial vehicle authentication apparatus 70 according to an exemplary embodiment. The apparatus 70 may be implemented as part or all of an electronic device via software, hardware, or a combination of both. As shown in FIG. 7A, the unmanned aerial vehicle authentication apparatus 70 includes an obtaining module 701 and a second sending module 702.

The obtaining module 701 is configured to obtain a current altitude from ground, wherein the altitude from the ground is a distance between the unmanned aerial vehicle and the ground.

The second sending module 702 is configured to send flight status information to a base station in response to the altitude from the ground being greater than or equal to a preset altitude threshold.

Figure 7B:
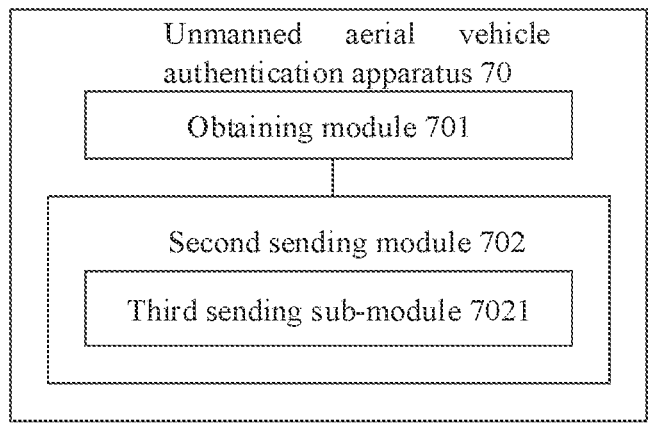
FIG. 7B is a schematic structural diagram of an unmanned aerial vehicle authentication apparatus according to an exemplary embodiment.

In one embodiment, as shown in FIG. 7B, the second sending module 702 includes a third sending sub-module 7021 configured to send a first radio resource control (RRC) signaling to the base station, the first RRC signaling including the flight status information.

Figure 7C:
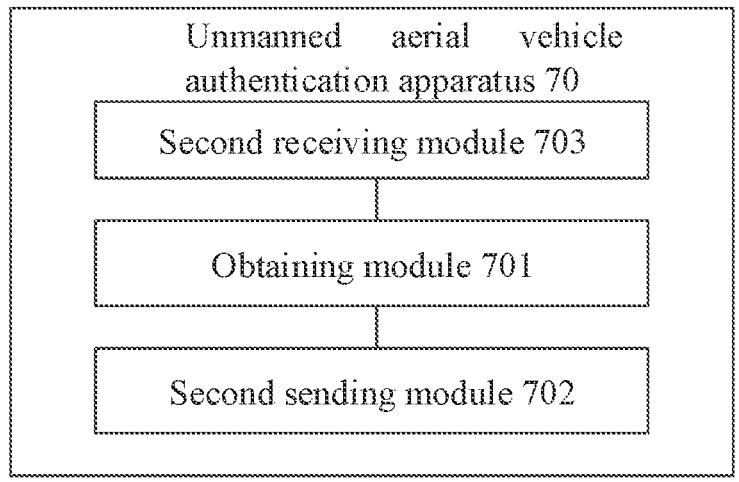
FIG. 7C is a schematic structural diagram of an unmanned aerial vehicle authentication apparatus according to an exemplary embodiment.

In one embodiment, as shown in FIG. 7C, the apparatus 70 further includes a second receiving module 703 configured to receive the preset altitude threshold sent by the base station.

Figure 7D:
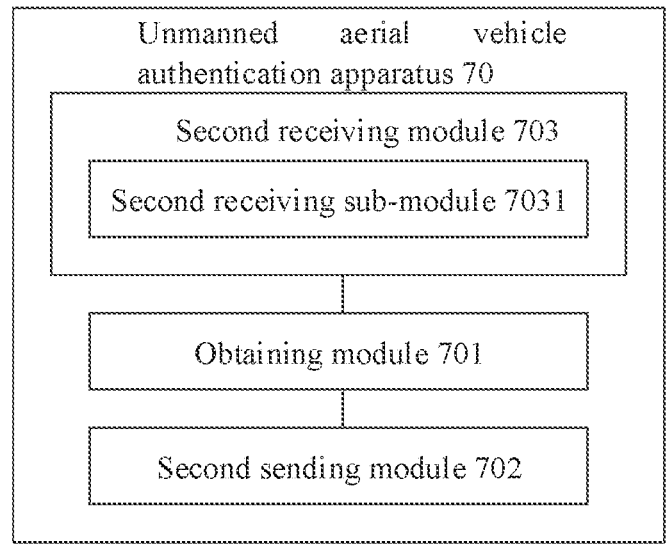
FIG. 7D is a schematic structural diagram of an unmanned aerial vehicle authentication apparatus according to an exemplary embodiment.

In one embodiment, as shown in FIG. 7D, the second receiving module 703 includes a second receiving sub-module 7031 configured to receive threshold information broadcasted by the base station, the threshold information including the preset altitude threshold.

Figure 7E:
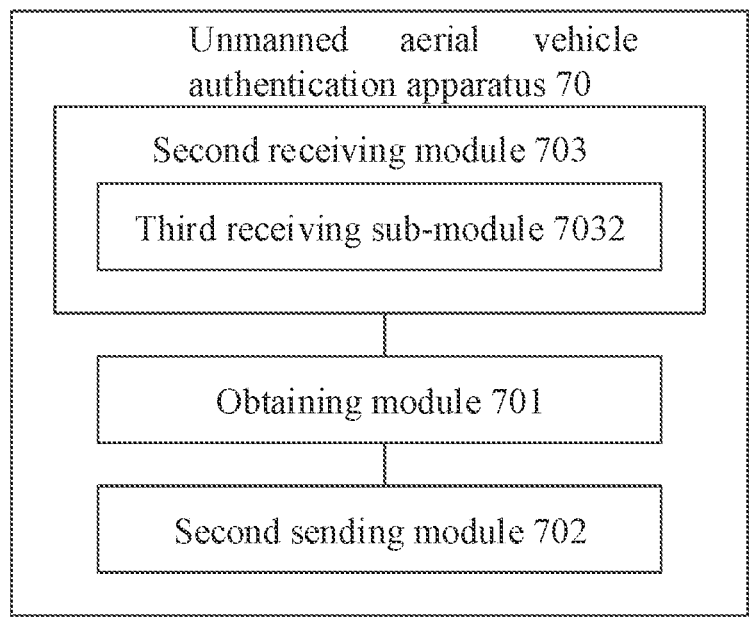
FIG. 7E is a schematic structural diagram of an unmanned aerial vehicle authentication apparatus according to an exemplary embodiment.

In one embodiment, as shown in FIG. 7E, the second receiving module 703 includes a third receiving sub-module 7032 configured to receive a second RRC signaling sent by the base station, the second RRC signaling including the preset altitude threshold.

The embodiment of the present disclosure provides an unmanned aerial vehicle authentication apparatus. The apparatus can send the flight status information to the base station according to the current altitude from the ground, so that the base station can determine whether the unmanned aerial vehicle currently in a flight status is a lawful unmanned aerial vehicle or an unlawful unmanned aerial vehicle according to the flight status information, further only provide the communication service for the lawful unmanned aerial vehicle and stop the provision of the communication service in response to the unmanned aerial vehicle being the unlawful unmanned aerial vehicle, thereby providing supervision for the unmanned aerial vehicle, improving the flight safety and facilitating the long-term development of the unmanned aerial vehicle.

The embodiment of the present disclosure further provides an unmanned aerial vehicle authentication apparatus, the apparatus includes:
a first processor; and
a first memory for storing instructions executable by the first processor.

The first processor is configured to:
determine whether the unmanned aerial vehicle is a lawful unmanned aerial vehicle or an unlawful unmanned aerial vehicle in response to flight status information reported by the unmanned aerial vehicle being received, wherein the flight status information is configured to indicate that an altitude of the unmanned aerial vehicle from ground is greater than or equal to a preset altitude threshold;
provide a communication service for the unmanned aerial vehicle in response to the unmanned aerial vehicle being the lawful unmanned aerial vehicle; and
stop the provision of the communication service for the unmanned aerial vehicle in response to the unmanned aerial vehicle being the unlawful unmanned aerial vehicle.

In one embodiment, the above first processor may be further configured to: release an RRC connection of the unmanned aerial vehicle in response to the unmanned aerial vehicle being the unlawful unmanned aerial vehicle.

In one embodiment, the above first processor may be further configured to: receive a first RRC signaling sent by the unmanned aerial vehicle, the first RRC signaling including the flight status information.

In one embodiment, the above first processor may be further configured to: send the preset altitude threshold to the unmanned aerial vehicle, so that the flight status information is sent to the base station in response to the altitude of the unmanned aerial vehicle from the ground being greater than or equal to the preset altitude threshold.

In one embodiment, the above first processor may be further configured to: broadcast threshold information, the threshold information including the preset altitude threshold.

In one embodiment, the above first processor may be further configured to: send a second RRC signaling to the unmanned aerial vehicle, the second RRC signaling including the preset altitude threshold.

In one embodiment, the above first processor may be further configured to: send a query request to a core network in response to the flight status information reported by the unmanned aerial vehicle being received, wherein the query request includes an identity of the unmanned aerial vehicle, so that the core network performs identity authentication of the unmanned aerial vehicle according to the identity; receive query feedback information sent by the core network, wherein the query feedback information is configured to indicate that the unmanned aerial vehicle is the lawful unmanned aerial vehicle or the unmanned aerial vehicle is the unlawful unmanned aerial vehicle; and determine whether the unmanned aerial vehicle is the lawful unmanned aerial vehicle or the unlawful unmanned aerial vehicle according to the query feedback information.

In one embodiment, the above first processor may be further configured to: confirm that the unmanned aerial vehicle is the lawful unmanned aerial vehicle in response to the query feedback information including a preset lawful identification; and confirm that the unmanned aerial vehicle is the unlawful unmanned aerial vehicle in response to the query feedback information including a preset unlawful identification.

In one embodiment, the above first processor may be further configured to: send a first S1-AP signaling to the core network through a S1 interface, the first S1-AP signaling including the query request.

In one embodiment, the above first processor may be further configured to: receive a second S1-AP signaling sent by the core network through the S1 interface, the second S1-AP signaling including the query feedback information.

The embodiment of the present disclosure provides an unmanned aerial vehicle authentication apparatus. The apparatus can determine whether the unmanned aerial vehicle currently in a flight status is a lawful unmanned aerial vehicle or an unlawful unmanned aerial vehicle, further provide the communication service in response to the unmanned aerial vehicle being the lawful unmanned aerial vehicle and stop the provision of the communication service in response to the unmanned aerial vehicle being the unlawful unmanned aerial vehicle, thereby providing supervision for the unmanned aerial vehicle, improving the flight safety and facilitating the long-term development of the unmanned aerial vehicle.

The embodiment of the present disclosure further provides an unmanned aerial vehicle authentication apparatus, including:
a second processor; and
a second memory for storing instructions executable by the second processor.

The second processor is configured to:

obtain a current altitude from ground, wherein the altitude from the ground is a distance between the unmanned aerial vehicle and the ground; and send flight status information to a base station in response to the altitude from the ground being greater than or equal to a preset altitude threshold.

In one embodiment, the above second processor may be further configured to: send a first radio resource control (RRC) signaling to the base station, the first RRC signaling including the flight status information.

In one embodiment, the above second processor may be further configured to: receive the preset altitude threshold sent by the base station.

In one embodiment, the second processor may be further configured to: receive threshold information broadcasted by the base station, the threshold information including the preset altitude threshold.

In one embodiment, the above second processor may be further configured to: receive a second RRC signaling sent by the base station, the second RRC signaling including the preset altitude threshold.

The embodiment of the present disclosure provides an unmanned aerial vehicle authentication apparatus. The apparatus can send the flight status information to the base station according to the current altitude from the ground, so that the base station can determine whether the unmanned aerial vehicle currently in a flight status is a lawful unmanned aerial vehicle or an unlawful unmanned aerial vehicle according to the flight status information, further only provide the communication service for the lawful unmanned aerial vehicle and stop the provision of the communication service in response to the unmanned aerial vehicle being the unlawful unmanned aerial vehicle, thereby providing supervision for the unmanned aerial vehicle, improving the flight safety and facilitating the long-term development of the unmanned aerial vehicle.

With regard to the device in the aforesaid embodiments, the specific manner in which the respective modules perform the operations has been described in detail in embodiments of the method, and will not be explained in detail herein.

Figure 8:
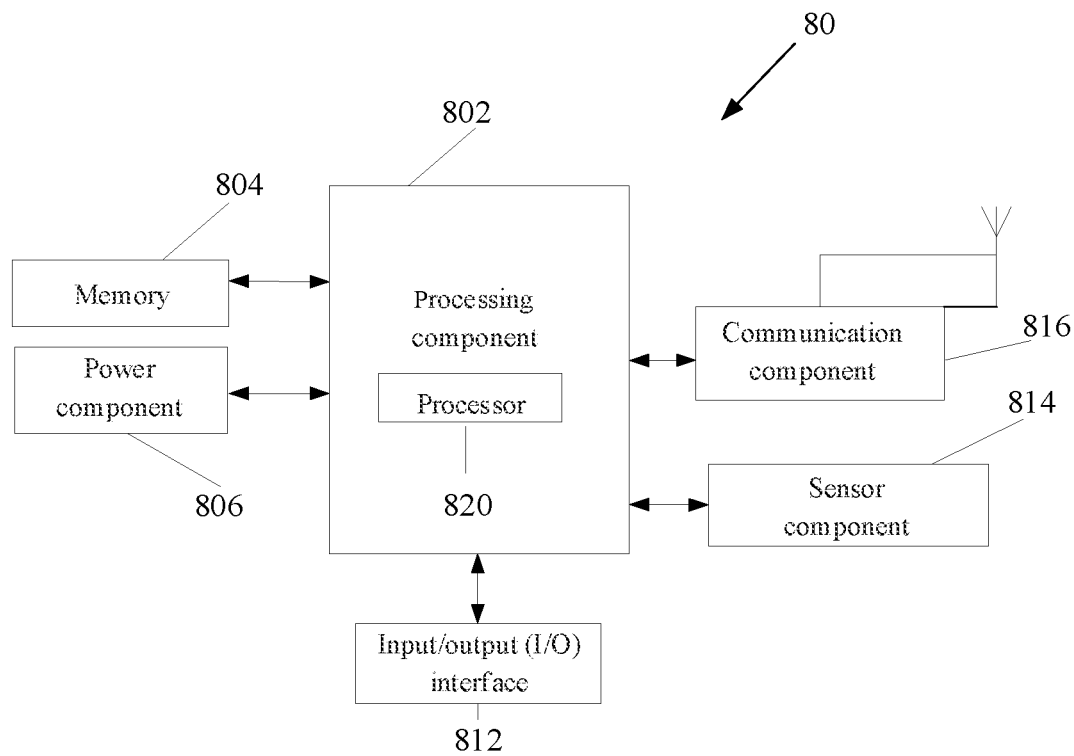
FIG. 8 is a structural block diagram of an unmanned aerial vehicle authentication apparatus according to an exemplary embodiment.

FIG. 8 is a block diagram showing an unmanned aerial vehicle authentication apparatus 80 according to an exemplary embodiment, which is suitable to a terminal device. For example, the apparatus 80 may be a mobile phone, a computer, a digital broadcast terminal, a message transceiver device, a game console, a tablet device, a medical device, a fitness device, a personal digital assistant, an unmanned aerial vehicle or the like.

The apparatus 80 may include one or more of the following components: a processing component 802, a memory 804, a power component 806, an input/output (I/O) interface 812, a sensor component 814, and a communication component 816.

The processing component 802 typically controls the overall operations of the apparatus 80, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components.

The memory 804 is configured to store various types of data to support the operation of the apparatus 80. Examples of such data include instructions for any applications or methods operated on the apparatus 80, contact data, phonebook data, messages, pictures, videos, etc. The memory 804 may be implemented by using any type of volatile or non-volatile memory devices, or a combination thereof, such as a static random access memory (SRAM) an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 80. The power component 806 may include a power management system, one or more power sources, and any other components associated with the generation, management, and distribution of power in the apparatus 80.

The I/O interface 812 provides an interface between the processing component 802 and peripheral interface modules, such as a keyboard, a click wheel, buttons, and the like. The buttons may include, but are not limited to, a home button, a volume button, a start button, and a lock button.

The sensor component 814 includes one or more sensors to provide status assessments of various aspects of the apparatus 80. For instance, the sensor component 814 may detect an on/off status of the apparatus 80, relative positioning of components, orientation or acceleration/deceleration of the apparatus 80, and temperature change of the apparatus 80. The sensor component 814 may include a proximity sensor configured to detect the presence of nearby objects without any physical contact. The sensor component 814 may also include a light sensor, such as a CMOS or CCD image sensor, used for imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 80 and other devices. The apparatus 80 can access a wireless network based on a communication standard, such as WiFi, 2G, 3G, 4G or 5G, or a combination thereof. In an exemplary embodiment, the communication component 816 receives broadcast signals or broadcast associated information from an external broadcast management system via a broadcast channel. In an exemplary embodiment, the communication component 816 further includes a near field communication (NFC) module to facilitate short-range communications.

In exemplary embodiments, the apparatus 80 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 804 including instructions, executable by the processor 820 in the apparatus 80, for performing the above-described methods. For example, the non-transitory computer-readable storage medium may be a ROM, a RAM, a CD-ROM, a magnetic tape, a floppy disc, an optical data storage device, and the like.

Figure 9:
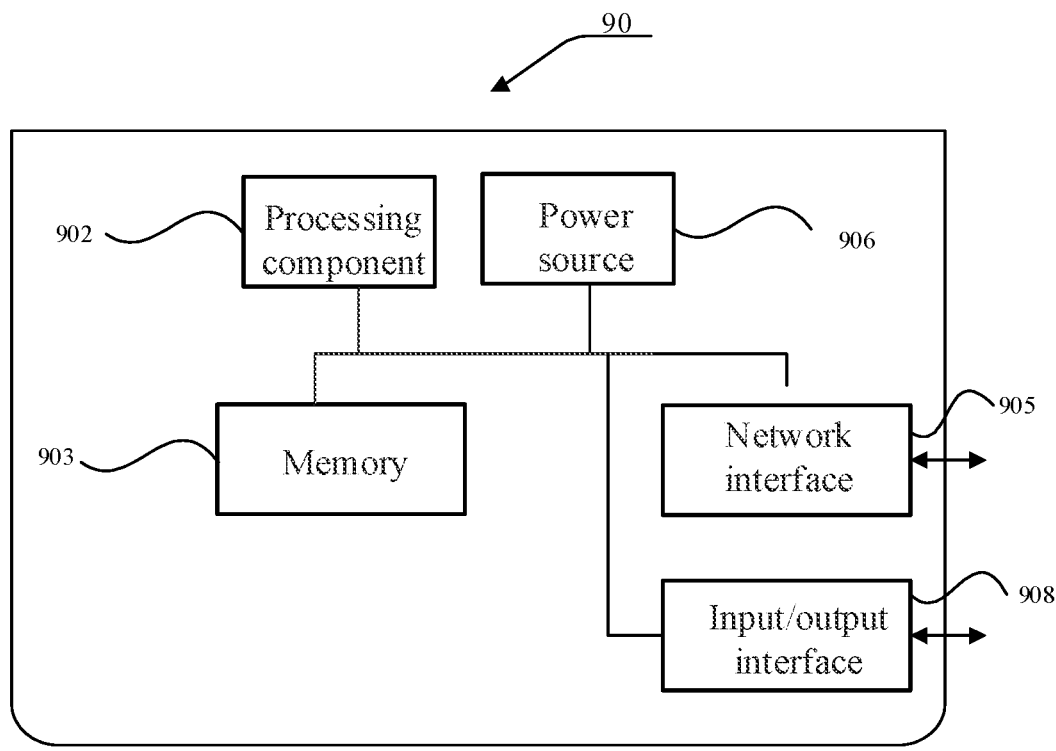
FIG. 9 is a structural block diagram of an unmanned aerial vehicle authentication apparatus according to an exemplary embodiment.

FIG. 9 is a block diagram of an unmanned aerial vehicle authentication apparatus 90 according to an embodiment. For example, the apparatus 90 may be provided as a server. The apparatus 90 may include a processing component 902 including one or more processors and memory resources represented by a memory 903 for storing instructions executable by the processing component 902, for example an application program. The application program stored in the memory 903 may include one or more modules, each of which corresponds to a set of instructions. Further, the processing component 902 is configured to execute instructions to perform the above method.

The apparatus 90 may further include a power source 906 for performing power management for the apparatus 90, a wired or wireless network interface 905 configured for connecting the apparatus 90 to a network, and an input/output interface 908. The apparatus 90 can operate an operating system stored in the memory 903, such as Windows Server™, Mac OS X™, Unix™, Linux™, FreeBSD™ or the like.

A non-transitory computer-readable storage medium, when instructions in the storage medium are executed by a processor of the apparatus 80, the apparatus 80 can execute the unmanned aerial vehicle authentication method of the unmanned aerial vehicle side. The method includes:

obtaining a current altitude from ground, wherein the altitude from the ground is a distance between the unmanned aerial vehicle and the ground; and sending flight status information to a base station in response to the altitude from the ground being greater than or equal to a preset altitude threshold.

In one embodiment, sending the flight status information to the base station includes: sending a first radio resource control (RRC) signaling to the base station, the first RRC signaling including the flight status information.

In one embodiment, the method further includes: receiving the preset altitude threshold sent by the base station.

In one embodiment, receiving the preset altitude threshold sent by the base station includes receiving threshold information broadcasted by the base station, the threshold information including the preset altitude threshold.

In one embodiment, receiving the preset altitude threshold sent by the base station includes receiving a second RRC signaling sent by the base station, the second RRC signaling including the preset altitude threshold.

A non-transitory computer-readable storage medium, when instructions in the storage medium are executed by a processor of the apparatus 90, the apparatus 90 can execute the unmanned aerial vehicle authentication method of the base station side. The method includes:

determining whether the unmanned aerial vehicle is a lawful unmanned aerial vehicle or an unlawful unmanned aerial vehicle in response to flight status information reported by the unmanned aerial vehicle being received, wherein the flight status information is configured to indicate that an altitude of the unmanned aerial vehicle from the ground is greater than or equal to a preset altitude threshold;

providing a communication service for the unmanned aerial vehicle in response to the unmanned aerial vehicle being the lawful unmanned aerial vehicle; and stopping the provision of the communication service for the unmanned aerial vehicle in response to the unmanned aerial vehicle being the unlawful unmanned aerial vehicle.

In one embodiment, stopping the provision of the communication service for the unmanned aerial vehicle in response to the unmanned aerial vehicle being the unlawful unmanned aerial vehicle includes: releasing the radio resource control (RRC) connection of the unmanned aerial vehicle in response to the unmanned aerial vehicle being the unlawful unmanned aerial vehicle.

In one embodiment, the method further includes: receiving a first RRC signaling sent by the unmanned aerial vehicle, wherein the first RRC signaling includes the flight status information.

In one embodiment, the method further includes: sending the preset altitude threshold to the unmanned aerial vehicle, so that the flight status information is sent to the base station in response to the altitude of the unmanned aerial vehicle from the ground being greater than or equal to the preset altitude threshold.

In one embodiment, sending the preset altitude threshold to the unmanned aerial vehicle includes broadcasting threshold information, the threshold information including the preset altitude threshold.

In one embodiment, sending the preset altitude threshold to the unmanned aerial vehicle includes: sending a second RRC signaling to the unmanned aerial vehicle, the second RRC signaling including the preset the altitude threshold.

In one embodiment, in response to the flight status information reported by the unmanned aerial vehicle being received, determining whether the unmanned aerial vehicle is the lawful unmanned aerial vehicle or the unlawful unmanned aerial vehicle includes: sending a query request reporting to a core network in response to the flight status information reported by the unmanned aerial vehicle being received, wherein the query request includes an identity of the unmanned aerial vehicle, so that the core network performs identity authentication of the unmanned aerial vehicle according to the identity; receiving query feedback information sent by the core network, wherein the query feedback information is configured to indicate that the unmanned aerial vehicle is the lawful unmanned aerial vehicle or the unmanned aerial vehicle is the unlawful unmanned aerial vehicle; and determining whether the unmanned aerial vehicle is the lawful unmanned aerial vehicle or the unlawful unmanned aerial vehicle according to the query feedback information.

In one embodiment, determining whether the unmanned aerial vehicle is the lawful unmanned aerial vehicle or the unlawful unmanned aerial vehicle according to the query feedback information includes: confirming that the unmanned aerial vehicle is the lawful unmanned aerial vehicle in response to the query feedback information including a preset lawful identification; and confirming that the unmanned aerial vehicle is the unlawful unmanned aerial vehicle in response to the query feedback information including a preset unlawful identification.

In one embodiment, sending the query request to the core network includes: sending a first S1-AP signaling to the core network through a S1 interface, the first S1-AP signaling including the query request.

In one embodiment, receiving the query feedback information sent by the core network includes: receiving a second S1-AP signaling sent by the core network through the S1 interface, the second S1-AP signaling including the query feedback information.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

What is claimed is:

1. An unmanned aerial vehicle authentication method, comprising:
   receiving flight status information reported by an unmanned aerial vehicle;
   determining whether the unmanned aerial vehicle is a lawful unmanned aerial vehicle or an unlawful unmanned aerial vehicle in response to whether the flight status information indicates that an altitude of the unmanned aerial vehicle from ground is greater than or equal to a preset altitude threshold;
   providing a communication service for the unmanned aerial vehicle in response to that the unmanned aerial vehicle is determined as the lawful unmanned aerial vehicle; and
   stopping provision of the communication service for the unmanned aerial vehicle in response to that the unmanned aerial vehicle is determined as the unlawful unmanned aerial vehicle.

2. The method according to claim 1, wherein stopping the provision of the communication service for the unmanned aerial vehicle in response to that the unmanned aerial vehicle is determined as the unlawful unmanned aerial vehicle comprises:
   releasing a radio resource control (RRC) connection of the unmanned aerial vehicle in response to that the unmanned aerial vehicle is determined as the unlawful unmanned aerial vehicle.

3. The method according to claim 1, further comprising one of following acts:
   receiving a first RRC signaling sent by the unmanned aerial vehicle, wherein the first RRC signaling comprises the flight status information; and
   sending the preset altitude threshold to the unmanned aerial vehicle, so that the unmanned aerial vehicle sends the flight status information to the base station in response to the altitude from the ground being greater than or equal to the preset altitude threshold.

4. The method according to claim 3, wherein sending the preset altitude threshold to the unmanned aerial vehicle comprises one of following acts:
   broadcasting threshold information, the threshold information comprising the preset altitude threshold, and
   sending a second RRC signaling to the unmanned aerial vehicle, the second RRC signaling comprising the preset altitude threshold.

5. The method according to claim 1, wherein determining whether the unmanned aerial vehicle is the lawful unmanned aerial vehicle or the unlawful unmanned aerial vehicle in response to whether the flight status information indicates that an altitude of the unmanned aerial vehicle from ground is greater than or equal to a preset altitude threshold comprises:
   sending a query request to a core network in response to the flight status information reported by the unmanned aerial vehicle being received, wherein the query request comprises an identity of the unmanned aerial vehicle, so that the core network performs identity authentication of the unmanned aerial vehicle according to the identity;
   receiving query feedback information sent by the core network, wherein the query feedback information is configured to indicate that the unmanned aerial vehicle is the lawful unmanned aerial vehicle or the unmanned aerial vehicle is the unlawful unmanned aerial vehicle; and
   determining whether the unmanned aerial vehicle is the lawful unmanned aerial vehicle or the unlawful unmanned aerial vehicle according to the query feedback information.

6. The method according to claim 5, wherein determining whether the unmanned aerial vehicle is the lawful unmanned aerial vehicle or the unlawful unmanned aerial vehicle according to the query feedback information comprises:
   confirming that the unmanned aerial vehicle is the lawful unmanned aerial vehicle in response to the query feedback information comprising a preset lawful identification; and
   confirming that the unmanned aerial vehicle is the unlawful unmanned aerial vehicle in response to the query feedback information comprising a preset unlawful identification.

7. The method according to claim 5, wherein sending the query request to the core network comprises:
sending a first S1-AP signaling to the core network through a S1 interface, the first S1-AP signaling comprising the query request.

8. The method according to claim 7, wherein receiving the query feedback information sent by the core network comprises:
receiving a second S1-AP signaling sent by the core network through the S1 interface, the second S1-AP signaling comprising the query feedback information.

9. An unmanned aerial vehicle authentication apparatus, comprising:
   a first processor; and
   a first memory for storing instructions executable by the first processor;
   wherein the first processor is configured to perform followings:
   determining whether an unmanned aerial vehicle is a lawful unmanned aerial vehicle or an unlawful unmanned aerial vehicle in response to flight status information reported by the unmanned aerial vehicle being received, wherein the flight status information is configured to indicate that an altitude of the unmanned aerial vehicle from ground is greater than or equal to a preset altitude threshold;
   providing a communication service for the unmanned aerial vehicle in response to the unmanned aerial vehicle being the lawful unmanned aerial vehicle; and
   stopping provision of the communication service for the unmanned aerial vehicle in response to the unmanned aerial vehicle being the unlawful unmanned aerial vehicle.

10. The apparatus according to claim 9, wherein the first processor is further configured to perform one of followings:
   releasing a radio resource control (RRC) connection of the unmanned aerial vehicle in response to the unmanned aerial vehicle being the unlawful unmanned aerial vehicle;
   receiving a first RRC signaling sent by the unmanned aerial vehicle, wherein the first RRC signaling comprises the flight status information; and sending the preset altitude threshold to the unmanned aerial vehicle, so that the unmanned aerial vehicle sends the flight status information to the base station in response to the altitude from the ground being greater than or equal to the preset altitude threshold.

11. The apparatus according to claim 10, wherein the first processor is further configured to perform one of followings:
broadcasting threshold information, the threshold information comprising the preset altitude threshold; and
sending a second RRC signaling to the unmanned aerial vehicle, the second RRC signaling comprising the preset altitude threshold.

12. The apparatus according to claim 9, wherein the first processor is further configured to perform followings:
sending a query request to a core network in response to the flight status information reported by the unmanned aerial vehicle being received, wherein the query request comprises an identity of the unmanned aerial vehicle, so that the core network performs identity authentication of the unmanned aerial vehicle according to the identity;
receiving query feedback information sent by the core network, wherein the query feedback information is configured to indicate that the unmanned aerial vehicle is the lawful unmanned aerial vehicle or the unmanned aerial vehicle is the unlawful unmanned aerial vehicle; and
determining whether the unmanned aerial vehicle is the lawful unmanned aerial vehicle or the unlawful unmanned aerial vehicle according to the query feedback information.

13. The apparatus according to claim 12, wherein the first processor is further configured to perform followings:
confirming that the unmanned aerial vehicle is the lawful unmanned aerial vehicle in response to the query feedback information comprising a preset lawful identification; and
confirming that the unmanned aerial vehicle is the unlawful unmanned aerial vehicle in response to the query feedback information comprising a preset unlawful identification.

* * * * *